US012225638B2

(12) United States Patent
Fan et al.

(10) Patent No.: US 12,225,638 B2
(45) Date of Patent: Feb. 11, 2025

(54) INTEGRATED MICROHEATER ARRAY FOR EFFICIENT AND LOCALIZED HEATING OF MAGNETIC NANOPARTICLES AT MICROWAVE FREQUENCIES

(71) Applicant: William Marsh Rice University, Houston, TX (US)

(72) Inventors: Yingying Fan, Houston, TX (US); Qingbo Zhang, Houston, TX (US); Linlin Zhang, Houston, TX (US); Gang Bao, Houston, TX (US); Taiyun Chi, Houston, TX (US)

(73) Assignee: William Marsh Rice University, Houston, TX (US)

( * ) Notice: Subject to any disclaimer, the term of this patent is extended or adjusted under 35 U.S.C. 154(b) by 67 days.

(21) Appl. No.: 17/650,982

(22) Filed: Feb. 14, 2022

(65) Prior Publication Data

US 2022/0264703 A1 Aug. 18, 2022

Related U.S. Application Data

(60) Provisional application No. 63/149,142, filed on Feb. 12, 2021.

(51) Int. Cl.
*H05B 3/26* (2006.01)

(52) U.S. Cl.
CPC ......... *H05B 3/265* (2013.01); *H05B 2214/04* (2013.01)

(58) Field of Classification Search
CPC ............................ H05B 3/265; H05B 2214/04
USPC ........................................................ 219/538
See application file for complete search history.

(56) References Cited

U.S. PATENT DOCUMENTS

| | | | | |
|---|---|---|---|---|
| 6,243,082 B1 * | 6/2001 | Konishi | G09G 3/3486 | 345/55 |
| 6,300,632 B1 * | 10/2001 | Liu | G01J 5/06 | 250/336.1 |
| 6,489,615 B2 * | 12/2002 | Bluzer | G01J 5/24 | 250/338.1 |
| 6,534,920 B1 * | 3/2003 | Uwabata | G09G 1/04 | 315/1 |
| 6,576,904 B1 * | 6/2003 | Volkening | H10N 15/20 | 374/E17.002 |
| 7,259,106 B2 * | 8/2007 | Jain | G02F 1/1368 | 257/E21.027 |
| 7,260,980 B2 * | 8/2007 | Adams | G01Q 60/42 | 73/61.49 |
| 7,375,333 B1 * | 5/2008 | Bluzer | G01J 5/08 | 250/338.4 |
| 7,982,296 B2 * | 7/2011 | Nuzzo | H01L 21/02628 | 257/466 |

(Continued)

FOREIGN PATENT DOCUMENTS

WO WO-2012094051 A2 * 7/2012 ........... H01Q 1/2283

*Primary Examiner* — Eric S Stapleton
(74) *Attorney, Agent, or Firm* — Osha Bergman Watanabe & Burton LLP

(57) ABSTRACT

An microheater array system includes an integrated microheater array configured to generate a localized heat and having a plurality of pixels. Each pixel includes: an inductor; a stacked oscillator configured to generate a magnetic field at microwave frequencies with tunable intensity and frequency; and an electro-thermal loop. The microheater array system may further include a plurality of magnetic nanoparticles (MNPs).

19 Claims, 37 Drawing Sheets

(56) References Cited

U.S. PATENT DOCUMENTS 8,039,847 B2 * 10/2011 Nuzzo ................. H01L 29/0665 438/758
8,097,926 B2 * 1/2012 De Graff .................. A61B 5/03 257/419
8,198,621 B2 * 6/2012 Rogers .............. H01L 21/02422 257/40
8,372,726 B2 * 2/2013 de Graff ........... H01L 27/14645 438/457
8,389,862 B2 * 3/2013 Arora ....................... H05K 1/00 174/254
8,470,701 B2 * 6/2013 Rogers .................... H01L 21/20 438/584
8,552,299 B2 * 10/2013 Rogers ................ H01L 21/4867 174/254
8,666,471 B2 * 3/2014 Rogers ................. A61B 5/6867 607/116
8,886,334 B2 * 11/2014 Ghaffari ................. A61B 5/145 607/115
8,934,965 B2 * 1/2015 Rogers ................. A61B 5/0036 600/545
9,054,491 B1 * 6/2015 Hurlbut ................. H01S 5/1071
9,159,635 B2 * 10/2015 Elolampi ............. H05K 1/0326
9,171,794 B2 * 10/2015 Rafferty .................. H01L 24/82
9,266,357 B1 * 2/2016 Facchini, II ......... B41J 11/0045
9,289,132 B2 * 3/2016 Ghaffari ............... A61B 5/7271
9,442,285 B2 * 9/2016 Rogers ............... G02B 26/0875
9,554,484 B2 * 1/2017 Rogers ................... H05K 1/189
9,647,171 B2 * 5/2017 Rogers ................ H01L 33/0093
9,691,873 B2 * 6/2017 Rogers ................. H01Q 1/2283
9,723,122 B2 * 8/2017 Ghaffari ............ H04M 1/72412
9,765,934 B2 * 9/2017 Rogers .................... H01L 24/24
9,936,574 B2 * 4/2018 Rogers ................. A61B 5/6867
10,438,339 B1 * 10/2019 Czarnota ............... G06T 7/0008
10,441,185 B2 * 10/2019 Rogers ................. A61B 5/4875
10,918,298 B2 * 2/2021 Rogers .................... H01L 24/24
2001/0021018 A1 * 9/2001 Basiji ................... G02B 27/148 356/419
2002/0117622 A1 * 8/2002 Bluzer ...................... G01J 5/20 250/338.1
2005/0162607 A1 * 7/2005 Miyachi ................. C09K 19/18 349/179
2006/0063351 A1 * 3/2006 Jain ....................... G02F 1/1368 438/455
2006/0076493 A1 * 4/2006 Bluzer ...................... G01J 5/22 374/E17.002
2007/0131861 A1 * 6/2007 Bluzer ...................... G01J 5/20 250/338.1
2008/0141880 A1 * 6/2008 Daniel .................... B41C 1/055 101/401.1
2008/0141884 A1 * 6/2008 Daniel ...................... B41C 1/00 101/401.1
2009/0278493 A1 * 11/2009 Alden ................... H02J 7/0042 320/108
2010/0270462 A1 * 10/2010 Nelson ................ G01T 1/20181 250/252.1
2011/0157137 A1 * 6/2011 Ben-Shalom ......... G02F 1/1333 29/595
2011/0180710 A1 * 7/2011 Bluzer ...................... G01J 5/24 250/340
2012/0021525 A1 * 1/2012 Fehr ................... G01N 21/6452 250/226
2012/0157804 A1 * 6/2012 Rogers .................... H01L 24/50 604/20
2012/0160826 A1 * 6/2012 Handique ............ H05B 3/0014 219/538
2012/0307229 A1 * 12/2012 Conroy ................ H04N 25/745 356/5.1
2013/0041235 A1 * 2/2013 Rogers ................. H05K 1/0283 600/386
2015/0217003 A1 * 8/2015 Garcia-Esteller ...... C01G 49/08 424/9.323
2016/0221680 A1 * 8/2016 Burton ................... H02K 3/522
2016/0306183 A1 * 10/2016 Niederer ............ G03B 21/2033
2017/0173262 A1 * 6/2017 Veltz ...................... G16H 20/17
2017/0253330 A1 * 9/2017 Saigh ................... G08G 5/0069
2018/0026589 A1 * 1/2018 Labanc ..................... H03F 1/42 156/345.48
2018/0048048 A1 * 2/2018 Socher ................. H01Q 1/2283
2018/0260598 A1 * 9/2018 Roizin ............... G06V 40/1306
2019/0033252 A1 * 1/2019 Huang ............... H10N 30/2047
2019/0043649 A1 * 2/2019 Saeki ...................... H01L 27/04

* cited by examiner $R_{in}$ = 51 μm; w/o MNP (xy cut)

$R_{in}$ = 81 μm ; w/o MNP (xy cut)

$R_{in}$ = 51 μm; w/ MNP (xy cut)

$R_{in}$ = 81 μm ; w/ MNP (xy cut)

$R_{in}$ = 51 μm; w/ MNP (z cut)

$R_{in}$ = 81 μm ; w/ MNP (z cut)

PDMS w/ MNPs for Pixel (2,2)

PDMS w/o MNPs for Pixel (2,2)

INTEGRATED MICROHEATER ARRAY FOR EFFICIENT AND LOCALIZED HEATING OF MAGNETIC NANOPARTICLES AT MICROWAVE FREQUENCIES

CROSS-REFERENCE TO RELATED APPLICATION

This International Patent application claims priority from U.S. Provisional Application No. 63/149,142, filed on Feb. 12, 2021. The content of this application is hereby incorporated herein in its entirety.

BACKGROUND

Temperature plays a role in determining physiological behavior of biological systems, and therefore, enabling localized yet accurate temperature manipulation in cells and tissues finds a wide range of biomedical applications. For example, localized heating may be used in neuroscience to activate thermal-sensitive ion channels, in hyperthermia treatment of cancer to disrupt cancer cells' ability to repair DNA damage, in expedited wound healing, in temperature-controlled drug release, and in bioanalytical techniques including polymerase chain reaction (PCR) and temperature gradient focusing (TGF). Controlled localized heating can avoid overheating and permanent damage to adjacent healthy tissues.

Magnetic nanoparticles (MNP) can absorb energy from alternating magnetic fields and subsequently dissipate heat to immediate surroundings, generating a localized heat sufficient for bio applications. Conventional magnetic thermal applicators face challenges including low heating efficiency and limited spatial resolution. Generally, in conventional devices, heating efficiency is low because the magnetic loss is proportional to frequency. As such, high field strength is needed at KHz-MHz to generate sufficient heat, requiring power-consuming benchtop magnetic field generators. Additionally, spatial resolution is limited because it is difficult to control the local magnetic field distribution with sub-millimeter spatial resolution using KHz-MHz coils, which usually range from 40-130 mm in diameter.

BRIEF SUMMARY OF THE INVENTION

In one aspect, embodiments disclosed herein relate to an integrated microheater array device including an array of pixels each including a population of MNP generating localized heat, a stacked oscillator generating an alternating magnetic field at microwave frequencies with tunable intensity and frequency, and an electro-thermal feedback loop providing feedback to configure an output power of the stacked oscillator and in turn to regulate the local temperature distribution.

In another aspect, embodiments disclosed herein relate to a method of localized heat generation based on MNP. The method includes applying MNP to a chip having a stacked oscillator and an electro-thermal feedback loop, generating an alternating magnetic field at microwave frequencies with tunable intensity and frequency controlled by the stacked oscillator, monitoring the localized heating, and providing feedback to configure an output power of the stacked oscillator and in turn to regulate the local temperature distribution.

Other aspects and advantages of this disclosure will be apparent from the following description made with reference to the accompanying drawings and the appended claims.

DETAILED DESCRIPTION

Figure 1:
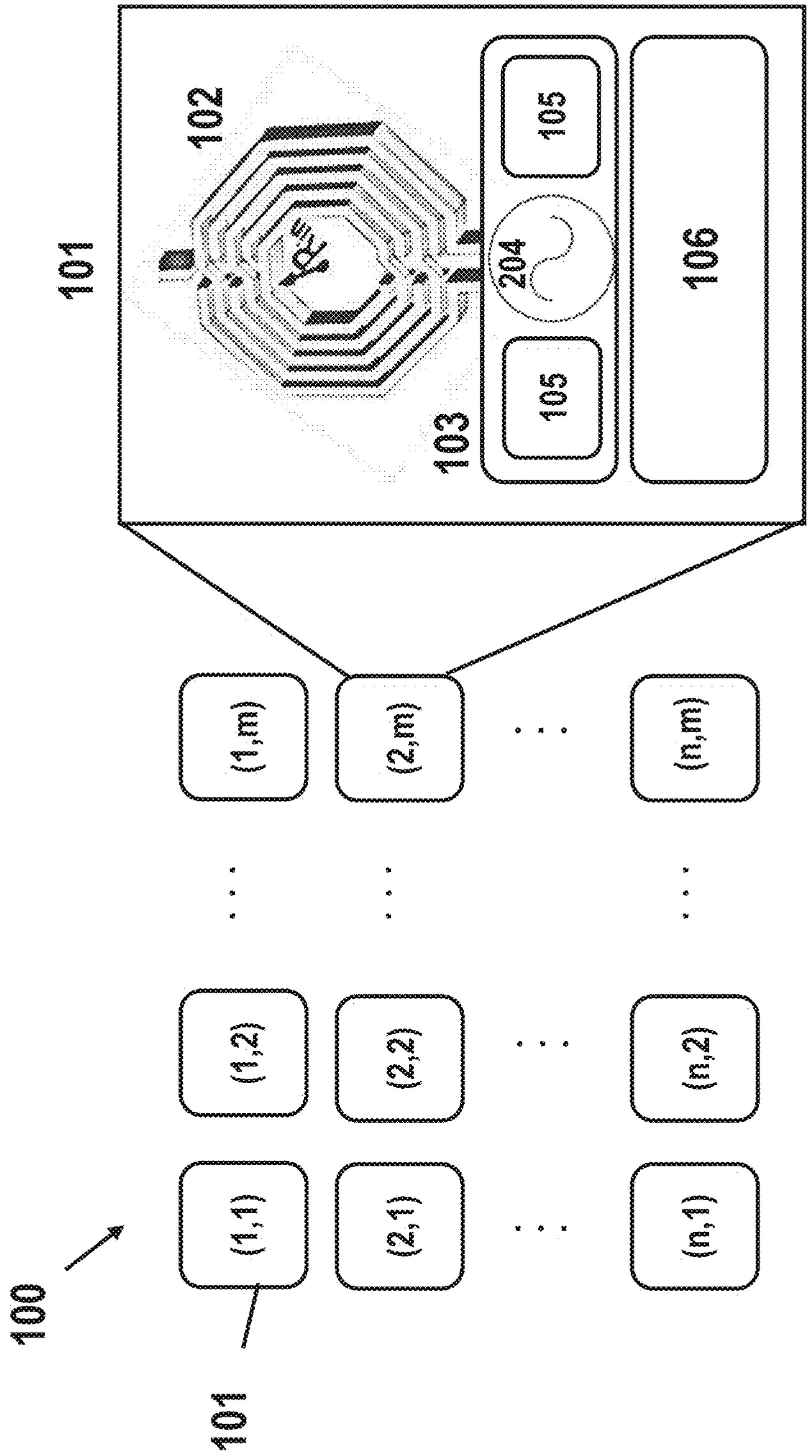
FIG. 1 shows an integrated microheater array according to one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a horizontal beam" includes reference to one or more of such beams.

Terms like "approximately," "substantially," etc., mean that the recited characteristic, parameter, or value need not be achieved exactly, but that deviations or variations, including for example, tolerances, measurement error, measurement accuracy limitations and other factors known to those of ordinary skill in the art, may occur in amounts that do not preclude the effect of the characteristic was intended to provide.

One or more embodiments of the present disclosure relate to an integrated microheater array device for efficient and localized heating of magnetic nanoparticles (MNP) at microwave frequencies. The integrated microheater array device of one or more embodiments of the present disclosure has high heating efficiency and high spatial resolution.

One or more embodiments of the present disclosure relate to an integrated microheater array device including an array of pixels. Each pixel may include a population of MNP, a stacked oscillator, and an electro-thermal feedback loop. MNP may have different nanostructures and compositions and thus, present different ferromagnetic resonance frequencies. MNP are capable of generating localized heat induced by an alternating magnetic field programmed by the stacked oscillator. The electro-thermal feedback loop monitors the localized heating and provides feedback to the stacked oscillator to configure an output power of the stacked oscillator and to regulate the local temperature distribution.

One or more embodiments of the present disclosure relate to method of localized heating by an integrated microheater array device with a stacked oscillator circuit topology. The integrated microheater array device can generate localized and programmable (in terms of frequency and amplitude) magnetic field at microwave frequencies, such as from 0.3 GHz to 300 GHz, through the proposed stacked oscillator circuit, and in turn, drive the magnetic nanoparticles to deliver localized heat at greater than 43° C., very efficiently. The achieved spatial resolution of the heating profile is 0.6 mm×0.7 mm, approaching a single-cell resolution.

While the integrated microheater array device achieves sub-millimeter resolution horizontally (in the XY plane), the penetration depth (in the Z direction) may range to about ~100 μm. One way to increase the penetration depth may include lowering the operating frequency to tens/hundreds of Megahertz, which may increase the penetration depth to millimeter- and centimeter-level.

Conventional oscillators on a silicon chip can generally only achieve a maximum voltage swing of <6 Vpp at microwave frequencies. In contrast, the proposed stacked oscillator of the present device, accordingly to one or more embodiments, demonstrates a 20-26 Vpp voltage swing, which is ~4× higher than conventional designs. As the magnetic field strength is proportional to the square of the voltage swing, the presently disclosed stacked oscillator can lead to ~16× magnetic field strength enhancement. The circuit topology can also be scaled to achieve an even higher voltage swing on silicon chips.

In addition, in one or more embodiments, the local temperature may be monitored by on-device temperature sensors. The sensor output may be used to control the magnetic field strength and the local heat generation in real-time through an electro-thermal feedback loop, resulting in a closed-loop operation to realize the desired temperature with a high precision and a high energy efficiency automatically. The presently described device is an integrated magnetic thermal applicator with sub-millimeter spatial resolution that may be widely applicable in, but not limited to, non-invasive biomedical heating applications.

The integrated microheater array device disclosed herein may be used for a wide range of applications, especially for power-constrained scenarios, e.g., battery-powered devices. For example, the device may be used in magnetogenetics with minimally invasive brain stimulation, where temperature-sensitive ion channels in the brain can be thermally activated using localized heating induced by MNP. A high spatial resolution (i.e., approaching a single-cell resolution) allows fine manipulation of the local temperature distribution and may potentially control the spike firing of individual neurons. Besides, for in-vitro cell-based neural stimulation experiments, the high heating resolution is advantageous in directing the neural signal propagation in a neural network.

The integrated microheater array device disclosed herein may be used for dose-controlled drug delivery, where drug molecules are loaded in a core/shell structure with the shell coated by MNP. Because of the high heating resolution, a number of shells to be heated up to release the drug molecules inside the core/shell structure is controllable, thus the dose and time of administration of the drug are controllable.

The integrated microheater array device disclosed herein may be used for skin cancer hyperthermia therapy. The localized heating may trigger apoptosis and disrupt cancer cells' ability to repair DNA damage. The technology will be useful to design heat patches for non-invasive skin cancer treatment. Due to its high spatial resolution, the patch can generate heat only in the tumor region without damaging the surrounding healthy tissues.

The method disclosed herein may include applying and/or disposing MNP in a position proximal to a chip having one or more pixels comprising a stacked oscillator and an electro-thermal feedback loop, and subsequently generating an alternating magnetic field with tunable intensity and frequency controlled by the stacked oscillator. The method may further include monitoring the localized heating, and providing feedback to configure and tune an output power of the stacked oscillator.

In one or more embodiments, a plurality of pixels of the microheater array 100 may be arranged in an array configuration with m columns and n rows, as shown in FIG. 1. Each pixel may be presented by their column and row numbers from (1,1) to (n,m). Each pixel 101 includes an inductor 102, a stacked oscillator 103, and an electro-thermal feedback loop 106. In one or more embodiments, the stacked oscillator may comprise an oscillator core 104 having a plurality of transistors, and one or more capacitor bank 105. Stacked oscillator 103 may use capacitor bank 105 to tune an oscillation frequency while tolerating a high RF output voltage swing. While FIG. 1 shows two capacitor banks, the present stacked oscillator may have one or more capacitor banks. In one or more embodiments, each stacked oscillator may have one differential capacitor bank, where a top plate and a bottom plate of the capacitor is connected to a positive output and a negative output, respectively. In one or more embodiments, each stacked oscillator may have two single-ended capacitor banks, whose bottom plate is grounded.

Though one inductor configuration is shown in FIG. 1, it is noted that the configuration including size and shape of the inductor is not limited to this example. An inner radius ($R_{in}$) of the inductor is defined as a distance from a center of the inductor to a furthermost point of the innermost turn of the inductor. In one or more embodiments, the inner radius ($R_{in}$) of the inductor modeled may be at micrometer scale, for example, from about 30 μm to about 300 or from about 30 μm to about 200 or from 30 μm to about 100 μm. A shape of the inductor may be symmetric or non-symmetric. In one or more embodiments, the inductor may have a coil (or spiral) geometry, for example, a single coil or intertwined multiple coils with underpasses. In one or more embodiments, the inductor may have a shape of square, hexagon, octagon, circular, or any other shape of interest. In one or more embodiments, the inductor may have one or more number of turns. The inductor may have one or more turns, for example, 1-turn, or 2-turn, or 3-turn, or 4-turn, or 5-turn, or 6-turn, or 7 and more turns.

Figure 2:
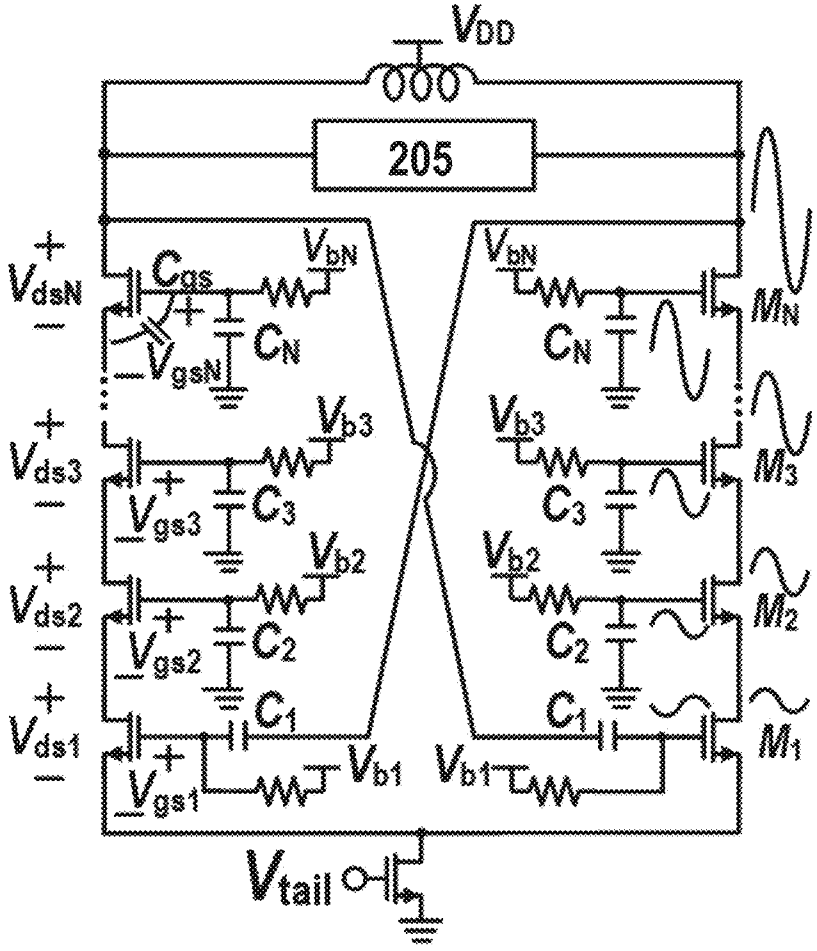
FIG. 2 shows a stacked oscillator according to one or more embodiments.

In one or more embodiments, a stacked oscillator has a topology as show in FIG. 2, where the stacked oscillator includes capacitor bank 205 and has an oscillator core shown in detail, in which multiple transistors are connected in series ($M_1$-$M_N$) to distribute a voltage stress and, in turn, to achieve a large RF output swing using a single inductor footprint. The transistors are stacked, and a biasing voltage ($V_b$), a gate capacitor (C), and a biasing resistor between $V_b$ and C are applied to each transistor. Both a drain-to-source voltage ($V_{ds}$) and a drain-to-gate voltage ($V_{ag}$) for transistors are close to one another and within a breakdown limit. In other words, values of $V_{ds1}$, $V_{ds2}$, to $V_{dsN}$ are close to one another and values of $V_{dg1}$, $V_{dg2}$, to $V_{dgN}$ are close to one another. Unlike cascode topology where gates of upper common-gate transistors are ac grounded, additional gate capacitors ($C_2$-$C_N$) are introduced to form a capacitive divider with a gate-to-source parasitic capacitance ($C_{gs}$), rendering a RF voltage swing at the gate. A goal of such design is to gradually build up the voltage swing at drain terminals from $M_1$ to $M_N$ and to ensure the $V_{ds}$ of each transistor is close to one another and smaller than the device breakdown limit. Different from stacked amplifiers, the stacked oscillator involves a positive feedback loop to sustain oscillation. This is accomplished by connecting the oscillator output to a gate of $M_1$ after voltage attenuation by a capacitor $C_1$ to keep a biasing voltage ($V_{GS}$) of $M_1$ in safe operating region. A tail transistor is used to adjust an oscillation amplitude, whose biasing voltage ($V_{tail}$) is controlled by electro-thermal feedback. A supply voltage ($V_{DD}$) of the stacked oscillator may depend on a number of transistors.

Figure 3:
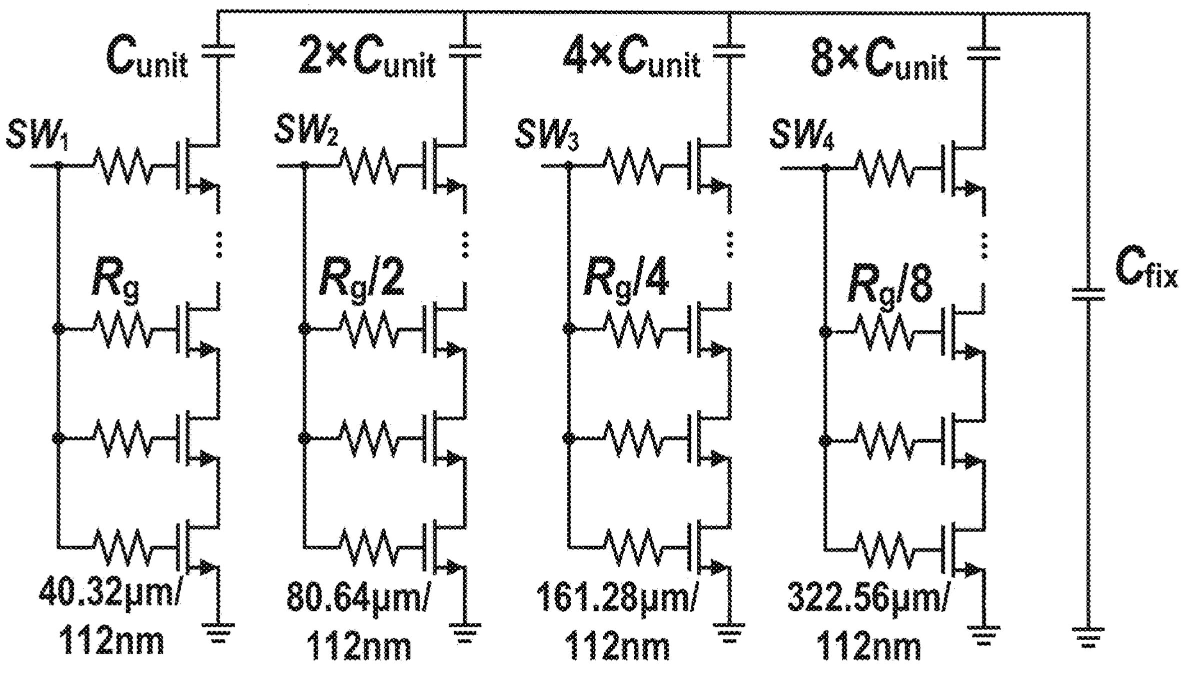
FIG. 3 shows a capacitor bank according to one or more embodiments.

In one or more embodiments, a capacitor bank has the topology shown in FIG. 3. Though a 4-bit switched capacitor bank is shown in FIG. 3, it is noted that the number of bits is not limited to this embodiment. Each capacitor bank may have a plurality of bits (parallel binary-weighted branches). Referring again to FIG. 3, the 4-bit switched capacitor bank includes four switches with a capacitance scaling ratio of 1, 2, 4, and 8, respectively. Turning off all switches lead to a fixed capacitance of $C_{fix}$. Adjusting the capacitance of the capacitor bank, by turning on or off switches SW1 to SW4, leads to change of the resonance frequency of the stacked oscillator. Turning on all switches result in an overall capacitance of (1+2+4+8) times of unit capacitance $C_{unit}$ plus the fixed capacitance $C_{fix}$. For SW1, a transistor width/transistor length is 40.32 μm/112 nm. For SW2 to SW4, the transistor width/transistor lengths are multiplied by the scaling ratio. There exists a trade-off between a frequency tuning range and a quality factor of the capacitor bank. A larger transistor size for switches reduces an on resistance, which increases the quality factor; however, a larger transistor size results in a larger off capacitance, which compromises the frequency tuning range. To alleviate this trade-off, the frequency tuning range may be divided into sub-ranges (for example, 1.2-1.6 GHz, 1.5-2.1 GHz, and 2.0-

2.62 GHz), and the stacked oscillators in different rows of array may be assigned with different sub-ranges. In addition, capacitances $C_{unit}$ and $C_{fix}$ and sizes of the switches may be optimized, such that the output RF swing remains almost constant over the entire frequency range.

Figure 4:
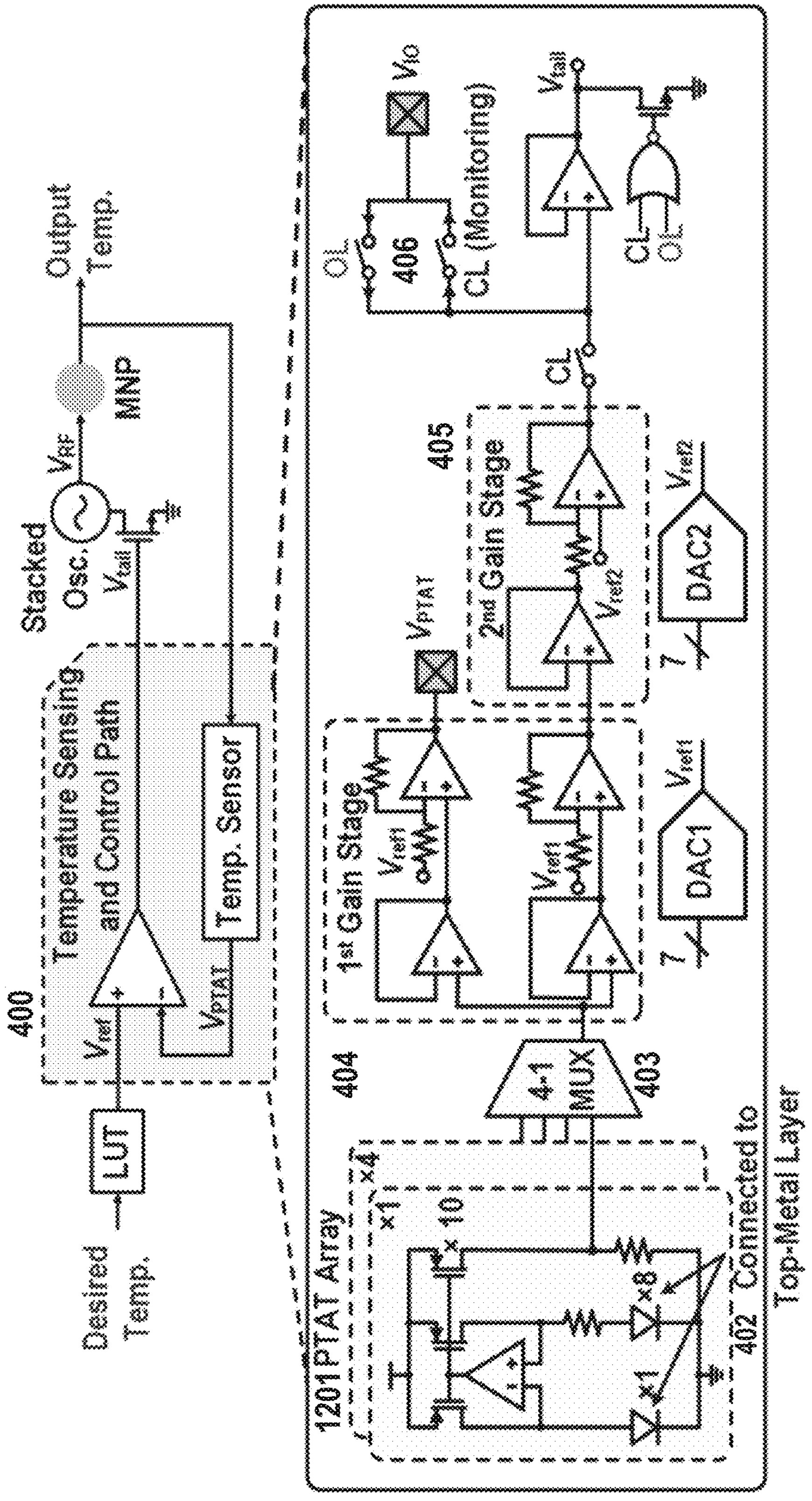
FIG. 4 shows an electro-thermal loop according to one or more embodiments.

In one or more embodiments, the electro-thermal feedback loop within each pixel has a circuit scheme as shown in FIG. 4. The electro-thermal feedback loop functions as a temperature sensing and control path to sense a local temperature and generate a biasing voltage for a tail transistor of the stacked oscillator for a closed-loop temperature control. The temperature sensing and control path 400 may include a Proportional-To-Absolute-Temperature (PTAT) temperature sensor array 401. Four diode pairs may be placed at four corners of the inductor and below a ground plane, which are relatively away from an oscillator core of the stacked oscillator to avoid sensing ohmic loss generated by the transistors. The diode pairs 402 are routed to the inductor, for example, a top-layer of floating metals in a center of the inductor, to sense a surface temperature.

Still referring to FIG. 4, in one or more embodiments, the electro-thermal feedback loop may include a 4-to-1 multiplexer (4-1 MUX) 1203. Followed by the 4-1 MUX, a PTAT output is further amplified and buffered to regulate the biasing voltage $V_{tail}$ of the tail transistor of the stacked oscillator. A $1^{st}$ gain stage 1204 and a $2^{nd}$ gain stage 405 may be used to ensure a large loop gain and their reference voltages are generated by two separate 7-bit coarse-fine resistor-string digital-to-analog converters (DACs). A reference voltage of the $1^{st}$ gain stage $V_{ref1}$ is set to guarantee the PTAT output is linearly amplified, and a reference voltage of the $2^{nd}$ gain stage $V_{ref2}$ is determined by a targeted temperature through a lookup table (LUT). A low impedance at $V_{tail}$ is highly desired, especially outside a bandwidth of unity-gain buffer, to filter out coupling from a strong oscillation swing. In one or more embodiments, a 1 pF capacitator may be added to $V_{tail}$, which also introduces a pole to the temperature sensing and control path. All the electrical poles may be designed and verified to be higher than 100 kHz. Thus, the electro-thermal feedback loop behaves as a first-order system without stability concerns.

Still referring to FIG. 4, in one or more embodiments, the electro-thermal feedback loop may be configured in multiple modes, for example, in three modes using a plurality of switches OL and CL 406. In a close-loop mode (OL=0 and CL=1), the PTAT array and the gain stages are enabled and buffer to the tail transistors. An input/output (IO) pad monitors response in real-time. Temperature configuration is enabled in a closed-loop mode. When the target temperature is set to a value, the localize temperature increases and settles in a short time after turning on the temperature sensing and control path. When the target temperature setting changes, the temperature sensing and control path provides feedback to configure the dc output power, and the temperature settles accordingly based on the targeted temperature setting. In an open-loop mode (OL=1 and CL=0), the PTAT and the gain stages are turned off, and the oscillator is controlled by an external biasing $V_{tail}$ of 0-1.1 V through the IO pad. In an off mode (OL=0 and CL=0), the stacked oscillator is turned off by a pull-down transistor, and the entire temperature sensing and control path is also turned off.

Figure 5:
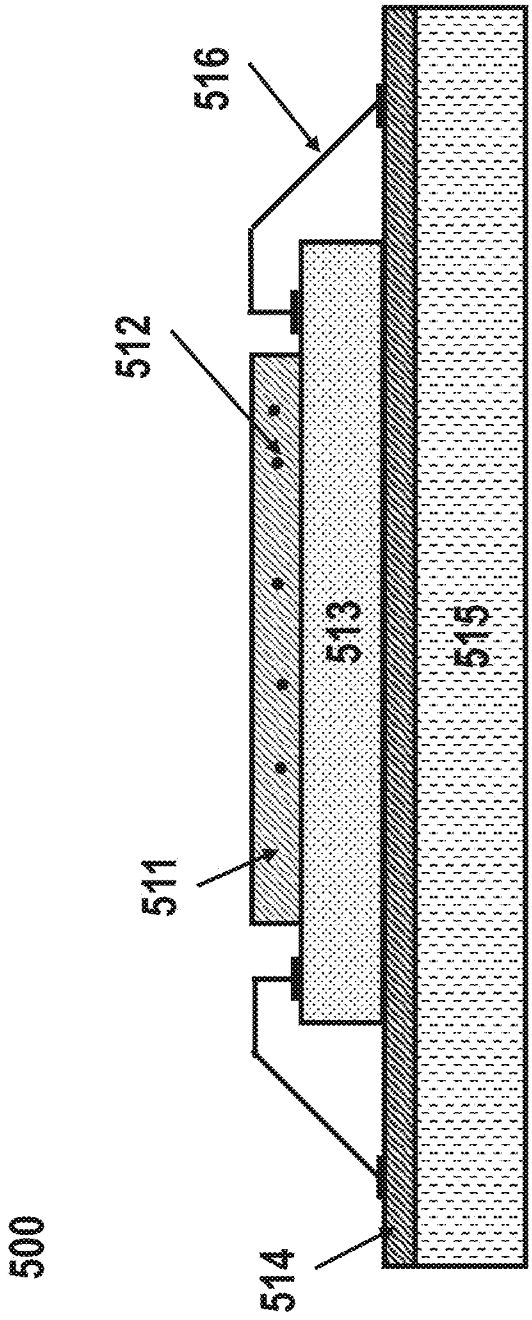
FIG. 5 shows an integrated microheater array system according to one or more embodiments.

An example of the integrated microheater array system according to one or more embodiments is shown in FIG. 5. Integrated microheater array device 500 includes a MNP layer 511 containing a population of MNPs 512, a microheater array 513 having a plurality of pixels, a metal layer 514, a substrate 515, and bonding wires 516. The MNP layer may be in liquid phase (for example, a solution) or solid phase (for example, a membrane). The MNPs are capable of generating localized heat when induced by an alternating magnetic field programmably controlled by the stacked oscillator. The metal layer may comprise copper trace. The bonding wires, which comprise a metal such as gold or aluminum, connects the microheater array to the metal layer on the substrate. The electro-thermal feedback loop monitors the localized heating and provides feedback to the stacked oscillator to configure an output power of the stacked oscillator and to regulate the local temperature distribution. The MNP layer may be disposed directly on the microheater array.

In one or more embodiments, the substrate may comprise one or more of silicon, polysilicon, silicon oxide, metal, and metal oxide. Examples of the substrate may include silicon wafer, silicon oxide, or a printed circuit board (PCB). The microheater array may be fabricated on the substrate by any known electronics fabrication method in the art, for example, photolithography, chemical processing, and may comprise one or more processes such as deposition, coating, patterning, etching, ionization, and packaging. In one or more embodiments, the fabrication of the integrated microheater array device may utilize silicon on insulator (SOI) technology, or more specifically a SOI complementary metal-oxide-semiconductor (CMOS) technology.

The MNPs are a class of microscopic magnetic nanomaterial with a diameter at nanometer scale, whose magnetic properties are distinct from those of bulk magnetic materials. The MNPs according to one or more embodiments may have different sizes, materials, nanostructures, and compositions and thus, present different ferromagnetic resonance frequencies. The MNPs may comprise one or more of iron, cobalt, nickel, chromium, manganese, or rare-earth element. The MNPs may be an oxide of aforementioned elements. In one or more embodiments, the MNPs may include a modification layer with various biologically functional compounds for biocompatibility, such as fatty acid, lipid, PEG, enabling diverse biomedical applications. The MNPs may be prepared by any known method in the art. The MNPs may be suspended in the MNP layer, in forms of a fluid with suspended MNPs or a membrane with embedded MNPs. In one or more embodiments, the MNP layer may be an aqueous solution of MNPs or a membrane of MNPs embedded in a polymer. The polymer may be a biocompatible polymer known in the art, such as polyacrylamide, polyethylene glycol, polylactic acid, polyacrylic acid, polydimethylsiloxane, polyglycolic acid, polycaprolactone, poly(N-isopropylacrylamide).

Figure 6A:
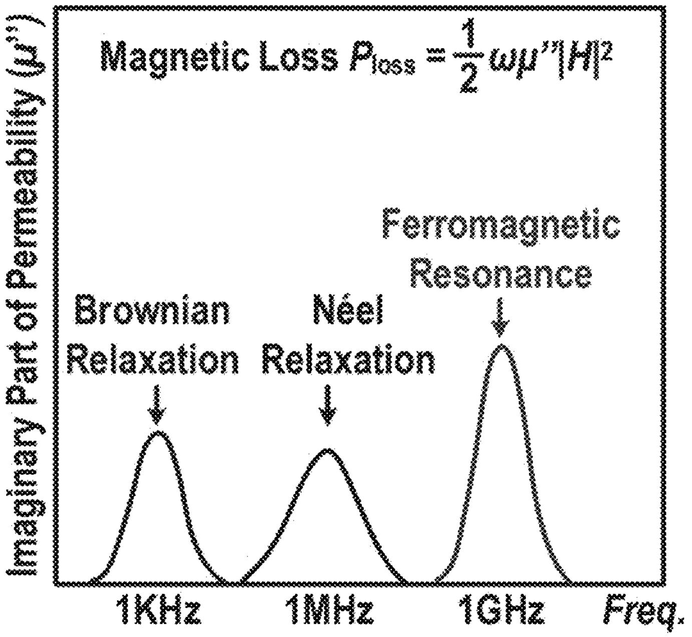
FIG. 6A shows the imaginary part of permeability of MNPs at different resonance frequencies.
Figure 6B:
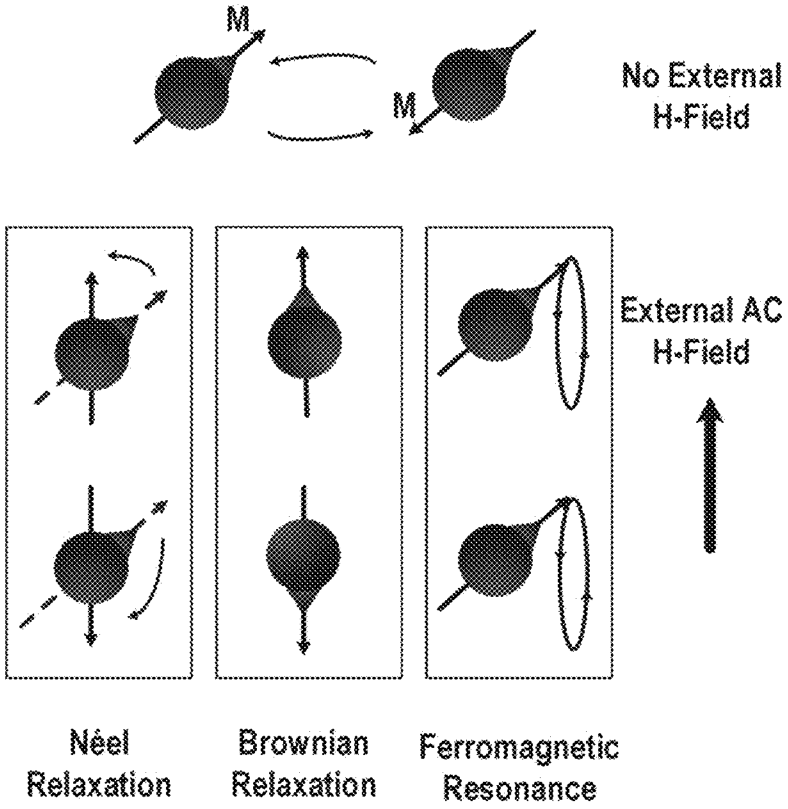
FIG. 6B shows MNP heating mechanisms at different resonance frequencies.

FIG. 6A and FIG. 6B show the mechanism of MNP heating, where FIG. 6A shows an illustration of the imaginary part of the permeability of MNP over frequency and FIG. 6B shows magnetic moments of different heating mechanisms. The low-frequency (kHz-MHz) peaks are attributed to Neel and Brownian relaxations, whereas the ferromagnetic resonance usually happens around GHz microwave frequencies. At a length scale below a critical point, the MNPs can support only a single magnetic domain, behaving as a macro magnetic moment. For example, such transition occurs at about 80 nm in diameter for MNPs made of magnetite ($Fe_3O_4$). Due to the magnetic anisotropy, there exist two energetically favorable directions for the magnetic moment, which are antiparallel to each other and separated by an energy barrier. When an external magnetic field is applied, heat can be generated by rotating the magnetic moment against the energy barrier. If the magnetic moment rotates while the particle itself remains fixed, then the particle undergoes Neel relaxation, and thermal energy is dissipated by the rearrangement of atomic dipole moments within the crystal. If the nanoparticle itself performs mechanical rotation, then the particle undergoes Brownian relaxation, and the heat is generated through shear stress in the surrounding fluid. On the other hand, ferromagnetic resonance happens when a frequency of the external magnetic field is equal to the precession frequency of the magnetic moment (Larmor frequency). Power of the external magnetic field is then absorbed by the MNP to sustain the precession and dissipated as heat.

Conventional MNP-based heaters are mostly based on Brownian or Neel relaxation at KHz to MHz. However, for applications requiring highly localized heating at cellular level (e.g., magnetogenetics), conventional MNP-based thermal devices are limited by low efficiency and limited spatial resolution. The reasons for the low efficiency may include: magnetic loss is proportional to frequency; and high field strength is required to generate sufficient heat, requiring power-consuming benchtop magnetic field generators. Furthermore, spatial resolution is limited because it is difficult to control the local magnetic field distribution using bulky coils (40-130 mm in diameter) at KHz to MHz.

One or more embodiments of the present disclosure relate to an integrated microheater array device based on ferromagnetic resonance of MNP, for example at gigahertz (GHz), with high heating efficiency and high spatial resolution. The integrated microheater array device can generate localized and programmable (in terms of frequency and amplitude) magnetic field at microwave frequencies, such as from about 0.3 GHz to about 300 GHz. The integrated microheater array device may include stacked oscillators designed with tunable ranges, allowing for efficient heating of a wide range of MNPs with different ferromagnetic resonant frequencies due to diverse sizes, material compositions, and nanostructures. The integrated microheater array device can efficiently deliver a localized heat of greater than 43° C. A spatial resolution of the heating profile can achieve sub-millimeter scale, approaching a single-cell resolution.

The integrated microheater array device achieves sub-millimeter resolution horizontally (in the XY plane) and the penetration depth (in the Z direction) may range to about ~100 μm. One way to increase the penetration depth may include lowering the operating frequency to tens/hundreds of megahertz, which may increase the penetration depth to millimeter- and centimeter-level.

Conventional oscillators on a silicon chip can generally only achieve a maximum voltage swing of <6 $V_{pp}$ at microwave frequencies. In contrast, the proposed stacked oscillator of the present invention, accordingly to one or more embodiments, demonstrates a voltage swing of at least 16 $V_{pp}$. In one or more embodiments, the voltage swing is at least 18 $V_{pp}$, or at least 20 $V_{pp}$, or 20-26 $V_{pp}$. The voltage swing may be ~4× higher than conventional designs. As the magnetic field strength is proportional to the square of the voltage swing, the presently disclosed stacked oscillator can lead to ~16× magnetic field strength enhancement. The circuit topology can also be scaled to achieve an even higher voltage swing on silicon chips.

One or more embodiments of the present disclosure relate to method of localized heating by an integrated microheater array device with a stacked oscillator circuit topology. The method disclosed herein may include disposing magnetic nanoparticles on a microheater array, wherein the microheater array comprises a plurality of pixels, each pixel comprises an inductor, a stacked oscillator, and an electro-thermal loop; generating a magnetic field at microwave frequencies with tunable intensity and frequency, monitoring a localized heat generated by magnetic nanoparticles in response to the magnetic field, and providing feedback through the electro-thermal loop to configure an output power of the stacked oscillator.

It will be understood that the term device in the term integrated microheater array device is used in the present disclosure to indicate a system. The system need not be integrated though it may contain assembled components which include an integrated microheater array.

EXAMPLES

Simulated Integrated Microheater Device in which an MNP Layer is a Solution

In general, embodiments described herein relate to microheater design for localized heat generation. Three mechanisms for heat loss generation, namely ohmic loss, dielectric loss, and magnetic loss, may be represented by equation (1):

$$P_{loss} = \frac{1}{2}\sigma|E|^2 + \frac{1}{2}\omega\varepsilon''|E|^2 + \frac{1}{2}\omega\mu''|H|^2 \tag{1}$$

where ω is an angular frequency [rad/s], σ is a conductivity [S], ε" is an imaginary part of permittivity [F/m], μ" is an imaginary part of permeability [H/m], |E| is magnitude of electrical field [V/m], and |H| is magnitude of magnetic field [A/m]. With regard to ohmic heating, which is prevalent in microheater design, one major disadvantage is that it tends to involve direct contact between heating elements and targeted bio-samples. For dielectric heating, it is suitable for samples whose dielectric properties are drastically different from the surrounding environment. However, in applications such as biomedical, permittivity difference between targeted cells/tissues and the surrounding environment is insignificant due to a high water content, resulting in poor specificity. For magnetic heating, it is usually accomplished by incorporating magnetic materials such as magnetic nanoparticles (MNPs). Since most bio-samples are non-magnetic, magnetic heating can support superior specificity than other modalities. When using NMPs for heat generation, there are generally three frequency-dependent heating mechanisms, namely Neel relaxation, Brownian relaxation, and ferromagnetic resonance. The heat loss of all three mechanisms can be modeled using the imaginary part of the permeability μ" (or the imaginary part of the susceptibility χ").

According to one or more embodiments, design and simulation of the integrated microheater array device may be achieved as follows. As described in equation (1), magnetic loss may be presented by $$P_{loss} = \frac{1}{2}\omega\mu''|H|^2,$$

which peaks with resonant frequencies of the imaginary part of the permeability μ". Another governing equation for MNP-based localized heating is heat transfer equation represented by equation (2):

$$\rho C\frac{\partial T}{\partial t} = k\nabla^2 T + P_{loss} \tag{2}$$

where T is temperature [K], ρ is density [kg/m$^3$], C is specific heat capacity [J/(kg·K)], and k is thermal conductivity [W/(m·K)]. The two equations are coupled by the power loss term $P_{loss}$, which serves as the volumetric heat source.

$$\rho C \frac{\partial T}{\partial t}$$

denotes the transient change of the heat energy, and $k\nabla^2 T$ models the flow of the heat due to thermal conduction. At a steady-state when $$\rho C \frac{\partial T}{\partial t} = 0,\ k\nabla^2 T = -P_{loss},$$

suggesting that under same initial temperature and boundary condition, a larger $P_{loss}$, which is proportional to an operating frequency and square of the magnetic field intensity, can lead to a higher temperature rise at the steady-state. For complex geometries such as inductors, the closed-form solutions (including the local magnetic field distribution and temperature distribution) are difficult to derive. Hence, numerical solutions are found by dividing the region of interest into smaller discrete voxels, assigning the corresponding material properties (μ, ε, σ, ρ, C, and k) to each voxel, and then solving in a finite-element-modeling (FEM) simulator. COMSOL Multiphysics® (hereinafter COMSOL) may be used for simulations, coupling the electromagnetics module and the heat transfer module to evaluate the localized heating process.

Design of the inductor plays a dominant role in determining local magnetic field intensity and temperature distribution. Hence, inductors with different radii and number of turns may be simulated. A three dimensional model may be built in COMSOL for optimizing device configuration and for simulation. Optimal inductor geometry is determined based on a trade-off between the simulated temperature/magnetic field distribution, the inductance, and the quality factor, so as to realize a relatively uniform temperature distribution on top of the inductor while sustaining the oscillation at GHz without excessive direct current (dc) power. An assumption applied in the simulations is that a RF excitation current generated by an oscillator remains constant and thus, for different inductor geometries, an RF swing $V_{swing}$ of the oscillator is proportional to inductance.

Figure 7A:
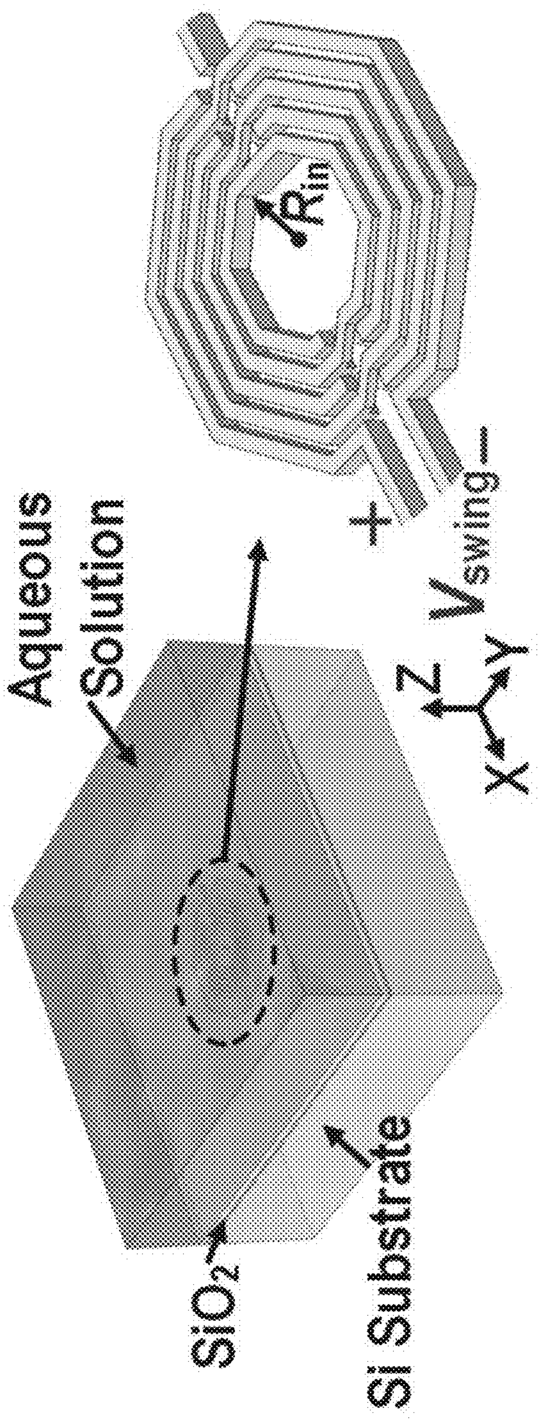
FIG. 7A shows a COMSOL simulation configuration according to one or more embodiments.
Figure 7B:
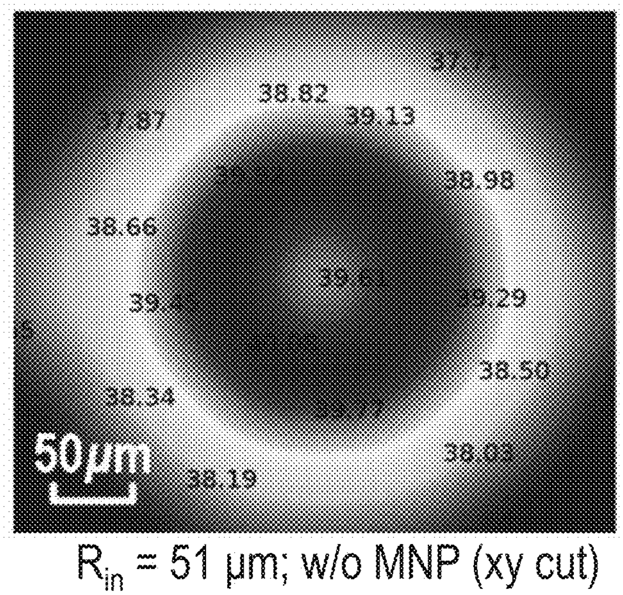
FIG. 7B shows an example of simulated temperature distribution according to one or more embodiments.

FIG. 7A shows a COMSOL simulation configuration according to one or more embodiments. The model may include a silicon substrate, a $SiO_2$ dielectric layer, an inductor, and a box of an aqueous MNP solution disposed directly on top. A plane of a surface of the substrate is defined as XY plane, and a Z direction is perpendicular to the XY plane. An intensity of the local magnetic field and a temperate generated from localized heating are simulated at 30 μm above the inductor, where both the intensity and the temperature peak on top of the innermost turn of the inductor. The inductor has a planar hexagon shape on the XY plane with a thickness on the Z direction, and is designed using two metal layers (a 4-μm aluminum layer and a 3-μm copper layer). An imaginary part of the relative permeability of the MNP solution is set to be 0.03 at 1.5 GHz for a MNP concentration of 1.4 wt % by weight of the solution, which is estimated based on material characterization. An inner radius ($R_{in}$) of the inductor is defined as a distance from a center of the inductor to a furthermost point of the innermost turn of the inductor, and is simulated in a range of 36 μm to 96 μm. An outer radius ($R_{out}$) of the inductor is defined as a distance from a center of the inductor to a furthermost point of the outermost turn of the inductor, and is determined based on one or more of the inner radius, the width of each turn, the gap between adjacent turns, and the number of turns. For example, the inductors may be 4-turn, or 5-turn, or 6-turn. For example, for the simulation, a width of each turn was 9 and a gap between two turns was 3.5 μm.

Figure 7C:
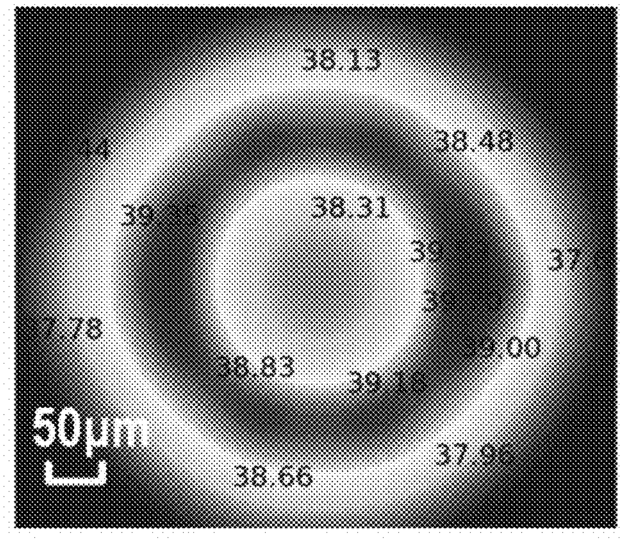
FIG. 7C shows an example of simulated temperature distribution according to one or more embodiments.
Figure 7D:
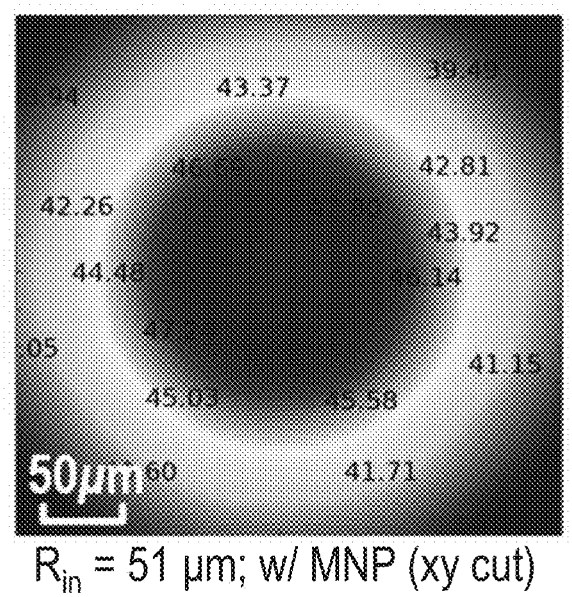
FIG. 7D shows an example of simulated temperature distribution according to one or more embodiments.
Figure 7E:
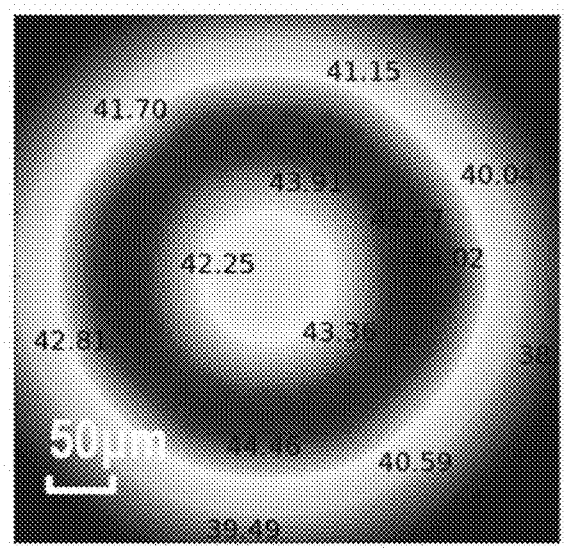
FIG. 7E shows an example of simulated temperature distribution according to one or more embodiments.
Figure 7F:
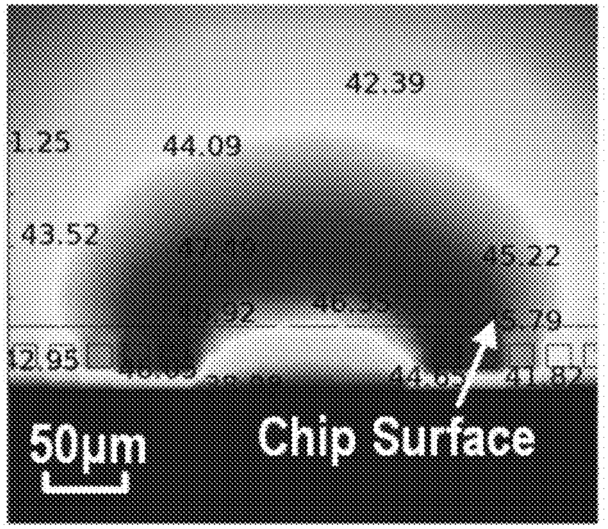
FIG. 7F shows an example of simulated temperature distribution according to one or more embodiments.
Figure 7G:
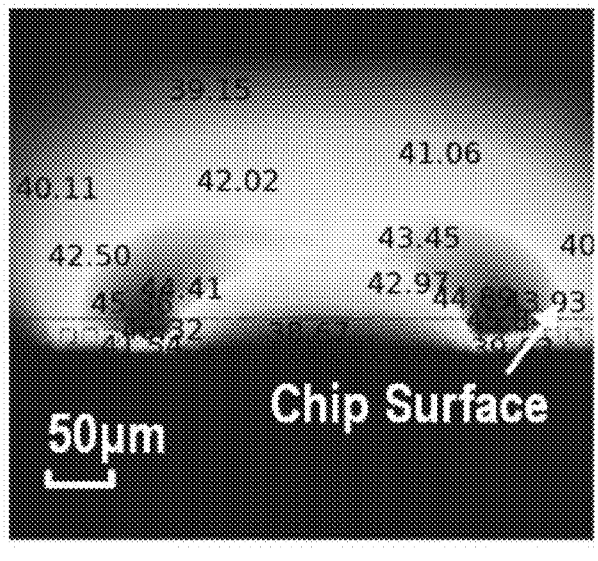
FIG. 7G shows an example of simulated temperature distribution according to one or more embodiments.
Figure 7H:
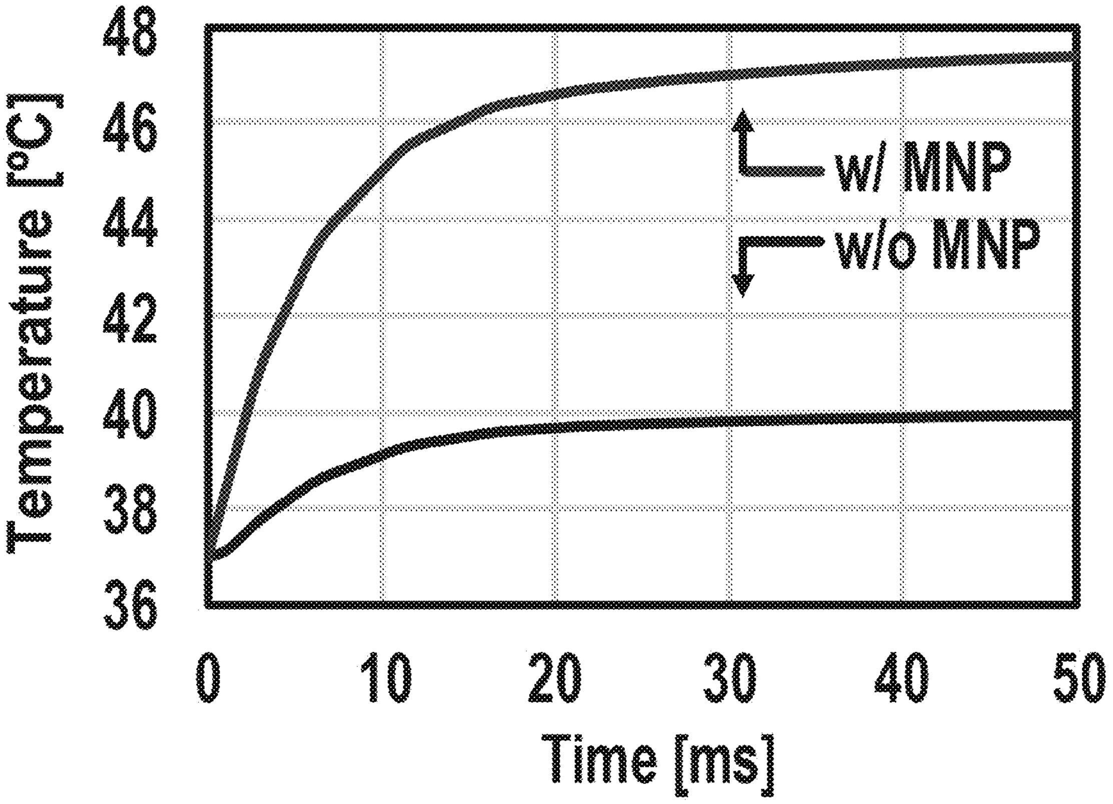
FIG. 7H shows an example of simulated temperature rise versus time according to one or more embodiments.

FIGS. 7B, 7C, 7D, 7E, 7F, and 7G show examples of simulated temperature distribution with and without MNP using two inductor geometries: inner radii $R_{in}$ of 51 μm and 81 μm, along a XY direction (XY cut) and a plane along the Z direction (Z cut). FIG. 7H shows simulated temperature with and without MNPs for a 5-turn 51-μm-$R_{in}$ inductor. An outer radius $R_{out}$ is 110 μm for the 5-turn 51-μm-$R_{in}$ inductor and 140 μm for the 5-turn 81-μm-$R_{in}$ inductor. With the presence of MNPs, using the selected 5-turn 51-μm-$R_{in}$ inductor, a 16 peak-to-peak voltage ($V_{pp}$) RF swing at 1.5 GHz can realize a temperature larger than 43° C. up to 80 μm above the inductor surface in the MNP solution. To the contrary, without the presence of MNP, the temperature stays lower than 40° C., which typically does not affect the viability of cells and tissues if the duration of the thermal stress is short. Note that 43° C. is the threshold temperature in a wide range of bioapplications, for example to activate TRPV1 channels in magnetogenetics. Further raising the temperature over a long time may introduce safety concerns. The simulation also demonstrates that a smaller $R_{in}$ leads to higher spatial resolution and more uniform heat distribution, and an optimal $R_{in}$ of the oscillator inductors is 51 μm compared to larger or smaller radii. While a smaller $R_{in}$ may involve an excessive dc current to sustain oscillation, which may compromise the oscillator loop gain and startup condition, increasing the $R_{in}$ results in a non-uniform temperature distribution above the inductor. When the inductor has a $R_{in}$ larger than 51 μm, a minimum local temperature appears in the center of the inductor, for example as shown in FIG. 7C.

Figure 7I:
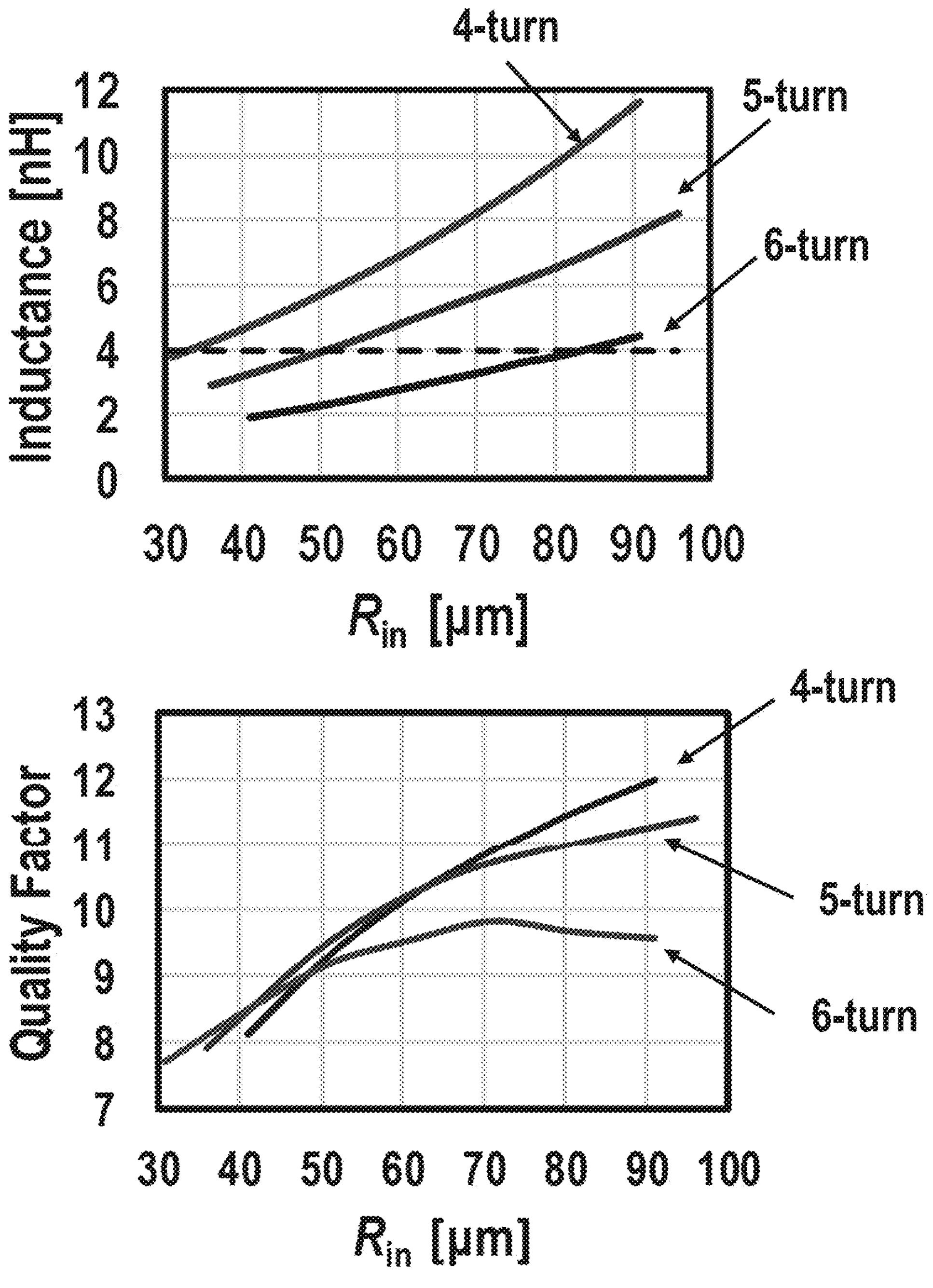
FIG. 7I shows simulated inductances and quality factors of different inductor geometries according to one or more embodiments.

Optimization of the number of turns is achieved as follows. To achieve an inductance as a 5-turn 51-μm-$R_{in}$ inductor, $R_{in}$ may increase to 85 μm for 4-turn inductors, which may result in not only a minimum local temperature in the center of the inductor but also a lower temperature rise. On the other hand, although a 6-turn 36-μm-$R_{in}$ inductor achieves similar size, distribution uniformity, and temperature rise as those of a 5-turn 51-μm-$R_{in}$ inductor, its quality factor is 1.6× lower, and its outermost turn contributes little to the effective heating area. Based on the trade-off, 5 turns with 51 μm $R_{in}$ is the optimal inductor geometry, resulting in 4.0 nH inductance and 9.5 quality factor at 1.5 GHz. FIG. 7I shows simulated inductances and quality factors of different inductor geometries at 1.5 GHz. An increase in the number of turns result in a higher inductance, however when the number of turns is more than 5, the quality factor may be compromised.

Simulated Stacked Oscillator

A design of the stack oscillator is described as follows. As the magnetic loss is proportional to the square of the magnetic field strength, a large RF swing is the key to increase the local temperature rise. In order to achieve a temperature of at least 43° C. for bioapplications, the multiphysics simulations determine a RF swing at GHz. Unfortunately, the maximum achievable output swing of conventional cross-coupled LC oscillators is twice of supply voltage, which is usually <5 V for RF CMOS technologies, which may be insufficient to generate the desired magnetic field. One possible solution to boost the RF swing is to amplify the oscillator output using RF amplifiers. However, additional inductors are needed in the design of RF amplifiers to serve as resonating tank or impedance matching network, which sacrifices a spatial resolution of the microheater array since the pixel size is dominated by the inductor footprint at GHz. Besides, RF amplifiers are power hungry at GHz, introducing significant dc power overhead. Thus, the present disclosure introduces a stacked oscillator topology and eliminates the need of RF amplifiers and achieves a compact pixel size as well as low dc power consumption.

Figure 8:
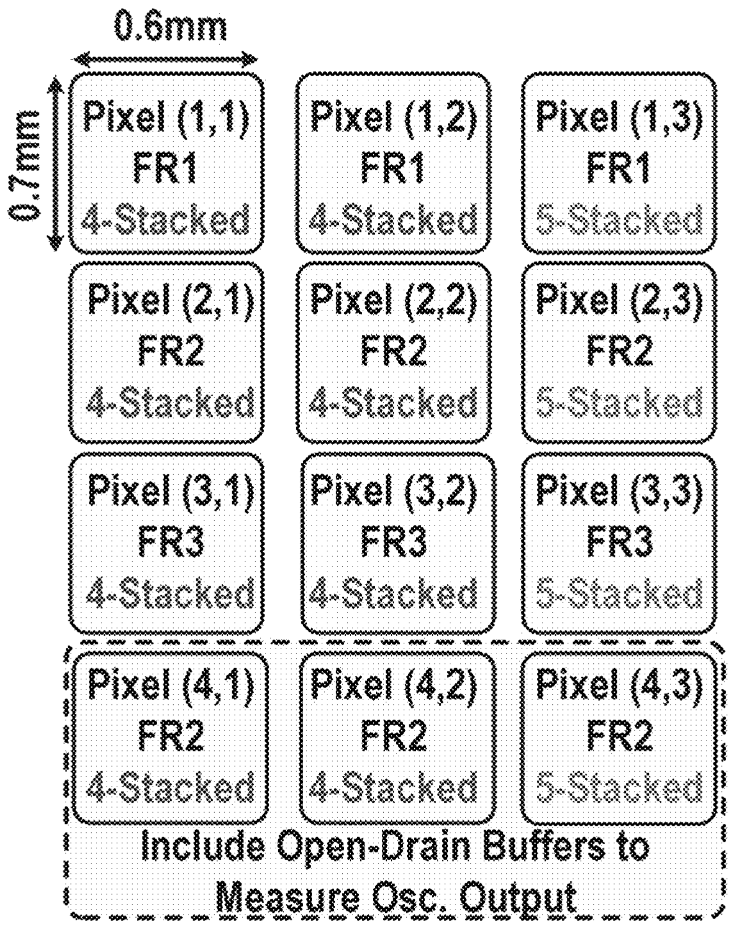
FIG. 8 shows a microheater array according to one or more embodiments.

FIG. 8 shows an example of the microheater array having stacked oscillators with different frequency ranges. The microheater array as shown includes 12 pixels. A size of each pixel is 0.6 mm×0.7 mm. The stacked oscillators in the first three rows of the array are designed with three different frequency tuning ranges: a first frequency range FR1 at 1.18 to 1.60 GHz, a second frequency range FR2 at 1.44 to 2.10 GHz, and a third frequency range FR3 from 2.00 to 2.62 GHz, allowing for efficient heating of a wide range of MNP with different ferromagnetic resonant frequencies due to their diverse sizes, material compositions, and nanostructures. In one or more embodiments, the stacked oscillators in the last row may be the same as those in the second row, except their outputs are capacitively coupled to an open-drain buffers. The stack oscillators in the first and second columns are four-stacked, while those in the third column are five-stacked. A higher RF output swing can be generated with a larger number of stacked transistors, resulting in stronger localized magnetic field and thermal stress.

Figure 9:
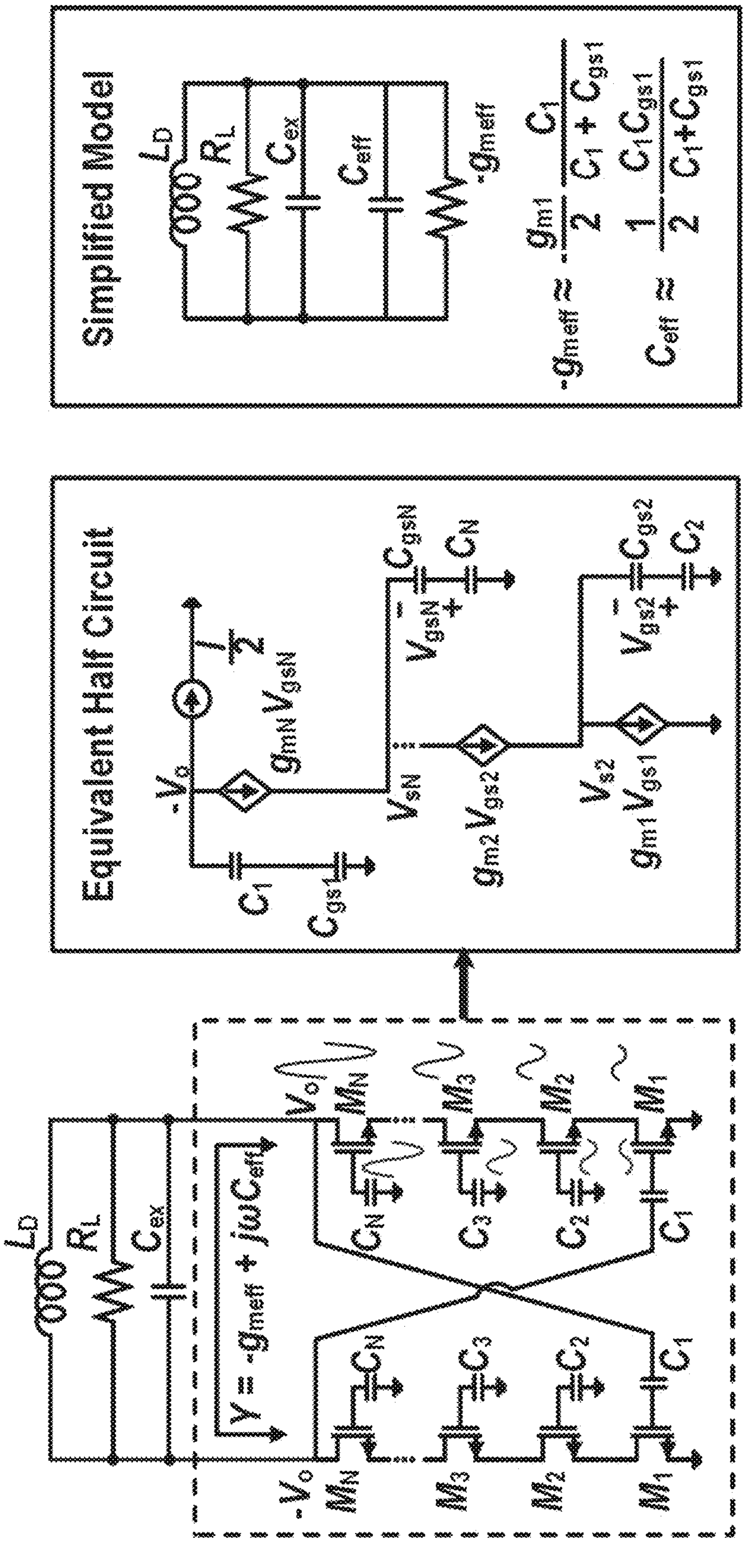
FIG. 9 shows a model of a stacked oscillator according to one or more embodiments.

To ensure a robust oscillation startup condition, a small-signal equivalent circuit model is derived to analyze a loop gain. FIG. 9 shows derivation of the small-signal equivalent circuit model of cross-coupled stacked-transistor pair. To simplify the derivation and establish an intuitive understanding of the circuit without compromising the accuracy, gate-to-source parasitic capacitance $C_{gs}$ is included but gate-to-drain parasitic capacitance $C_{gd}$ and output resistance of the transistor $r_o$ are ignored. An equivalent half circuit model is represented by equation (3):

$$g_{mN-1}V_{gsN-1} = g_{mN}V_{gsN} + j\omega C_{gsN}V_{gsN} \tag{3}$$

where $g_m$ is a transistor transconductance, $V_{gs}$ is a small-signal gate voltage, co is an angular frequency, and $$V_{gsN} = \frac{-C_N}{C_N + C_{gsN}}V_{sN} \tag{4}$$

A differential output admittance Y of the cross-coupled stacked-transistor pair can then be derived in equation (5) as $$Y = \frac{I}{2V_o} = \frac{-g_{m1}g_{m2}\cdots g_{mN}}{2(g_{m2}+sC_{gs2})\ \ldots\ (g_{mN}+sC_{gsN})}\frac{C_1}{C_1+C_{gs1}} + j\omega\frac{C_1C_{gs1}}{2(C_1+C_{gs1})} \tag{5}$$

Assuming transistor transconductance $g_m$ is much larger than $j\omega C_{gs}$, which is true for GHz oscillator designs where the oscillation frequency is much lower than a cutoff frequency of the transistor ($f_T$), the amount of RF current flowing into the gate capacitors can be ignored, and equation (4) can be simplified in equation (6) as $$y \approx -\frac{g_{m1}}{2}\frac{C_1}{C_1+C_{gs1}} + j\omega\frac{C_1C_{gs1}}{2(C_1+C_{gs1})} = -g_{m,eff} + j\omega C_{eff} \tag{6}$$

A small-signal loop gain $A_v$ can be calculated in equation (7) as $$A_v = g_{m1}\frac{C_1}{C_1+C_{gs1}}R_L \tag{7}$$

Here, $R_L$ is an effective parallel resistance of output the LC tank, represented in equation (8) as $$R_L = Q_L\omega_{osc}L_D \tag{8}$$

$$\omega_{osc} = \frac{1}{\sqrt{L_D(C_{ex}+C_{eff})}} \tag{9}$$

where $L_D$ is an output inductance, $Q_L$ is a quality factor of the inductor, $\omega_{osc}$ is an oscillation frequency, and $C_{ex}$ is an additional capacitance in parallel with the output inductor. Oscillators can start to oscillate as long as the loop gain is larger than 1. In one or more embodiments, a small-signal loop gain $A_v$ of larger than 2 is set as criteria for a robust startup condition.

Figure 10:
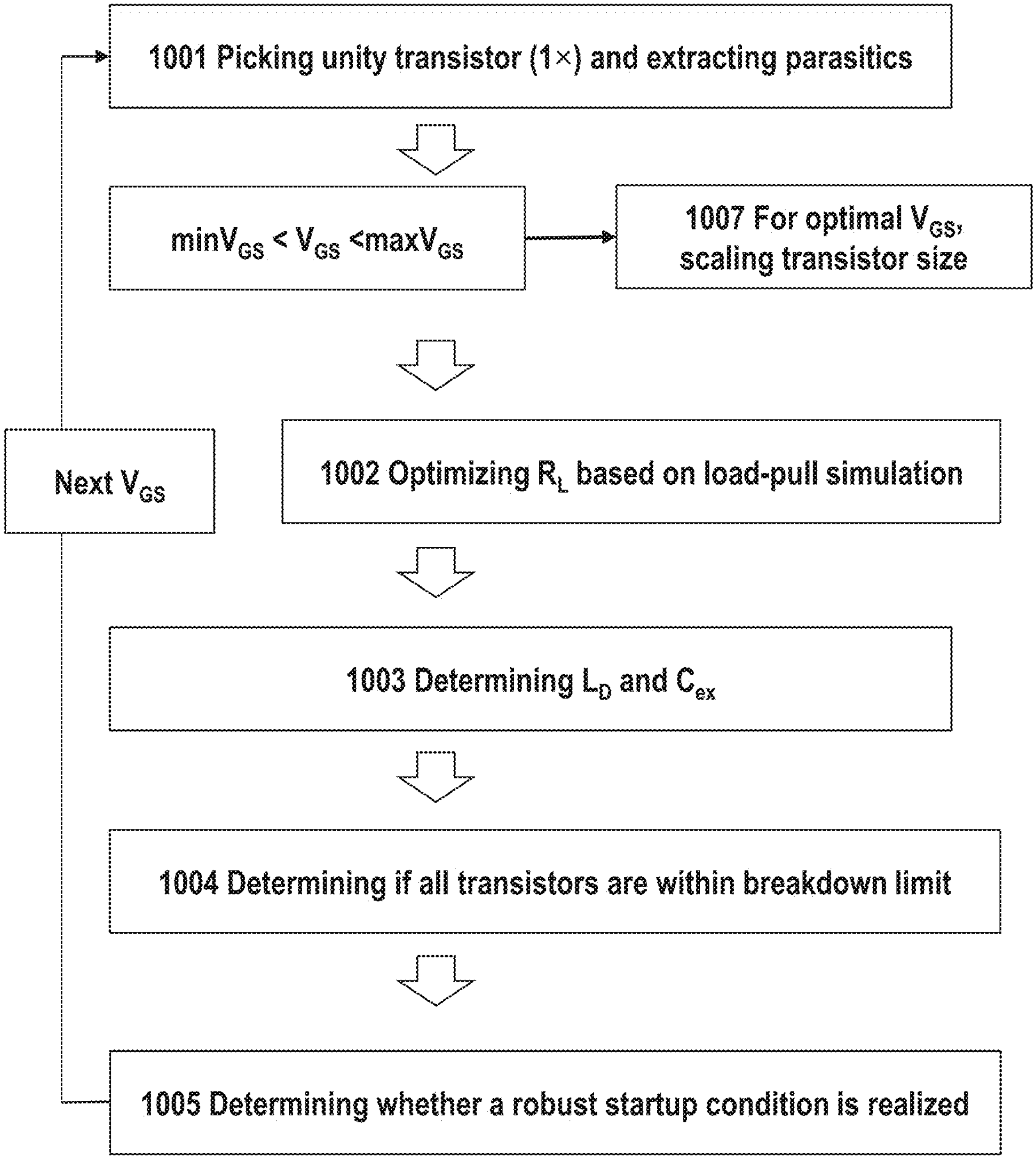
FIG. 10 shows an optimization flow for a dc-to-RF efficiency of a stacked oscillator according to one or more embodiments.

A dc-to-RF efficiency of the stacked oscillator is a design specification that can be used to minimize a dc power consumption and undesired ohmic loss from transistors. Since an oscillator is inherently a large-signal circuit, an optimization flow as shown in FIG. 10 is applied to find optimal design parameters, including transistor size, biasing voltage for stacked transistors $V_{GS}$, the additional parallel capacitance $C_{ex}$, and the gate capacitances $C_1$-$C_N$. The optimization flow not only optimizes the dc-to-RF efficiency but also considers the breakdown limit of stacked transistors and the oscillation startup condition. It is under the assumption that a quality factor of the inductor $Q_L$ remains constant for different inductances, and the oscillation frequency is fixed.

In one or more embodiments, a Vgs is optimal if it satisfies a high dc-to-RF efficiency, a robust startup, and transistors within breakdown limit 3 V. The optimization simulation starts with picking up an arbitrarily sized transistor, which is referred to as a unity transistor (1×), and extracting its layout parasitics to ensure accurate device modeling at GHz (1001). Theoretically, a peak dc-to-RF efficiency is achieved when load impedance is chosen in a way that the output voltage swing and a device current swing are simultaneously maximized. For each $V_{GS}$ within a certain range from min$V_{GS}$ to max$V_{GS}$, since the optimal load impedance is biasing dependent, an optimal $R_L$ for different $V_{GS}$ is determined based on large-signal load-pull simulations (1002). Rather than utilizing an impedance transformation network to realize the desired $R_L$, it is provided in the present invention that $R_L$ is an effective parallel resistance of the inductor. As such, once $R_L$ is determined, an optimal $L_D$ can be calculated based on equation (8), and a desired $C_{ex}$ to sustain the oscillation at desired frequency can be calculated based on equation (9) (1003). Next, gate capacitances $C_1$-$C_N$ are chosen to make sure all transistors are within the breakdown limit (1004). Meanwhile, it is determined whether a robust startup condition can be realized based on the small-signal loop gain (1005). If it is determined that a robust startup condition cannot be realized, the value is discarded. This process is repeated by sweeping $V_{GS}$ (1006). Once an optimal $V_{GS}$ is determined, the transistor size is scaled by a factor of $L_{opt}/L_D$ (1007), as the optimal inductor geometry and its corresponding inductance $L_{opt}$ have been decided based on the multiphysics simulations.

Figure 11:
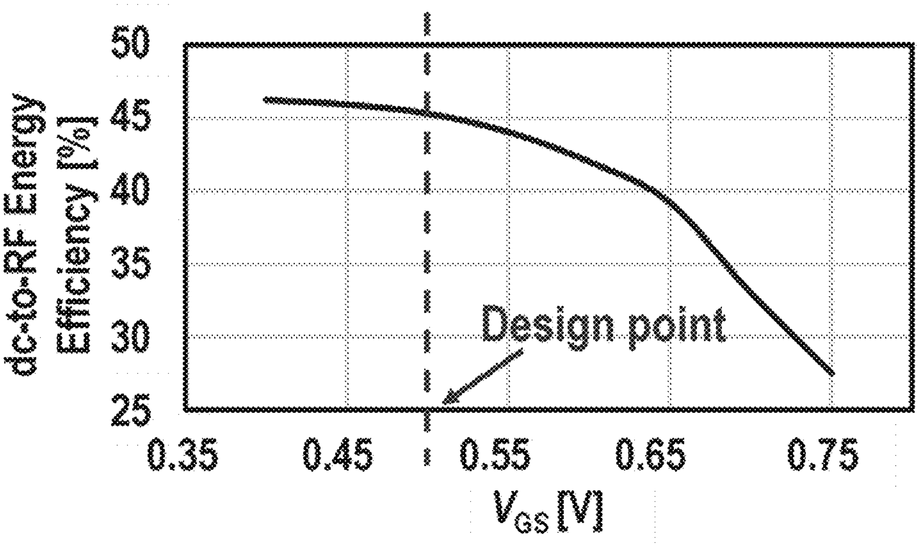
FIG. 11 shows simulation results for a dc-to-RF energy efficiency of a stacked oscillator according to one or more embodiments.

According to the optimization flow described herein, a simulated dc-to-RF efficiency against the biasing voltage of stacked transistors $V_{GS}$ is shown in FIG. 11. Intuitively, a smaller $V_{GS}$ reduces a conduction angle in large-signal operation, leading to a better energy efficiency. However, further decreasing $V_{GS}$ will compromise the loop gain. Since a $V_{GS}$ smaller than 0.4 V can no longer guarantee robust oscillation startup across process and temperature variations and the efficiency remains similar for a $V_{GS}$ smaller than 0.5 V, 0.5 V is chosen as an optimal design point. The optimization yields a final implementation of a four-stacked oscillator with 200 μm/112 nm transistor size and a five-stacked oscillator with 248 μm/112 nm transistor size, resulting in a 45% simulated dc-to-RF efficiency and a loop gain of at least 2.3 across the entire frequency range FR1 to FR3.

Figure 12A:
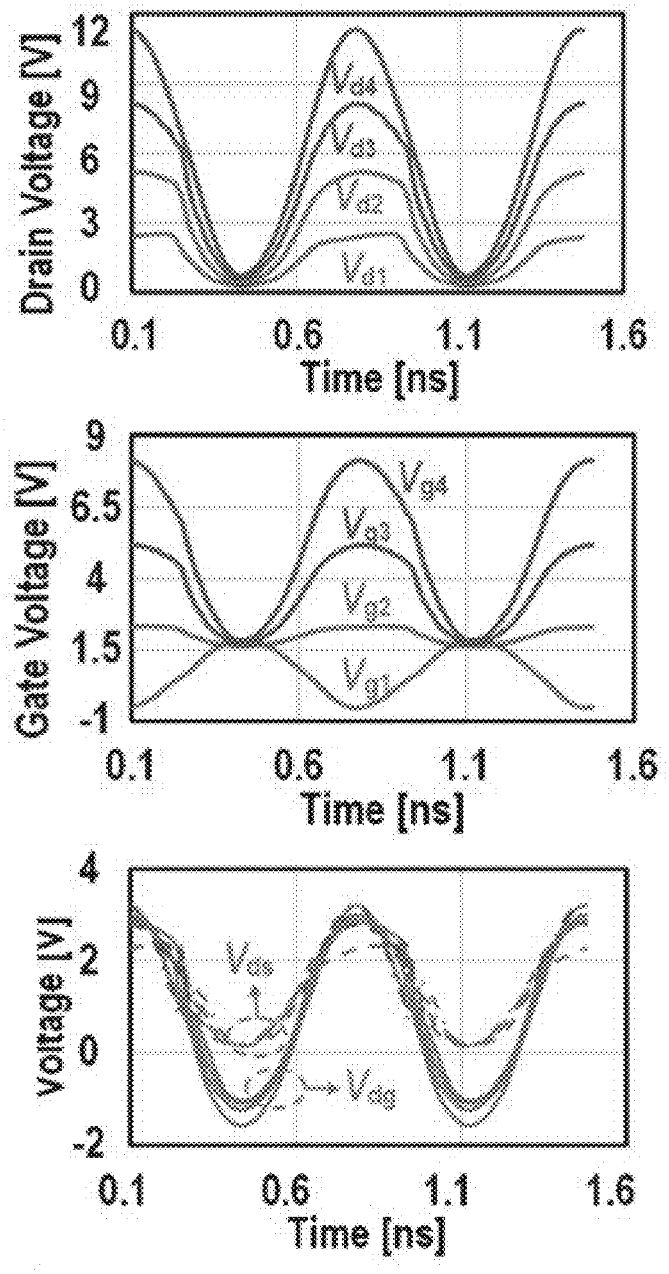
FIG. 12A shows simulation results of a four-stacked oscillator according to one or more embodiments.
Figure 12B:
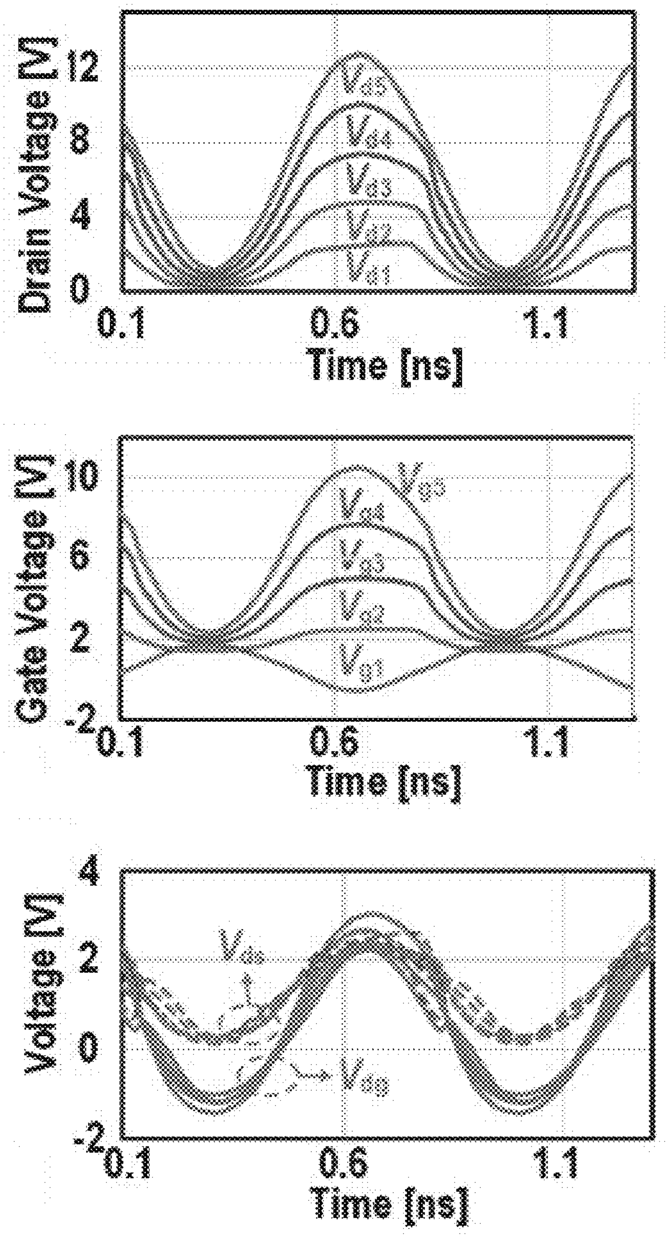
FIG. 12B shows simulation results of a five-stacked oscillator according to one or more embodiments.

An example of simulated drain, gate, drain-to-source, and drain-to-gate transient waveforms of four-stacked oscillator and five-stacked oscillator are shown in FIGS. 12A and 12B. The gate voltage ($V_g$) and drain voltage ($V_d$) swing gradually build up from the bottom transistor to the top, and only $V_{g1}$ is out of phase due to a positive feedback. The simulation results also verify that $V_{ds}$ and $V_{dg}$ for different transistors are close to one another and within the breakdown limit of 3 V.

Simulated Capacitor Bank

Figure 13:
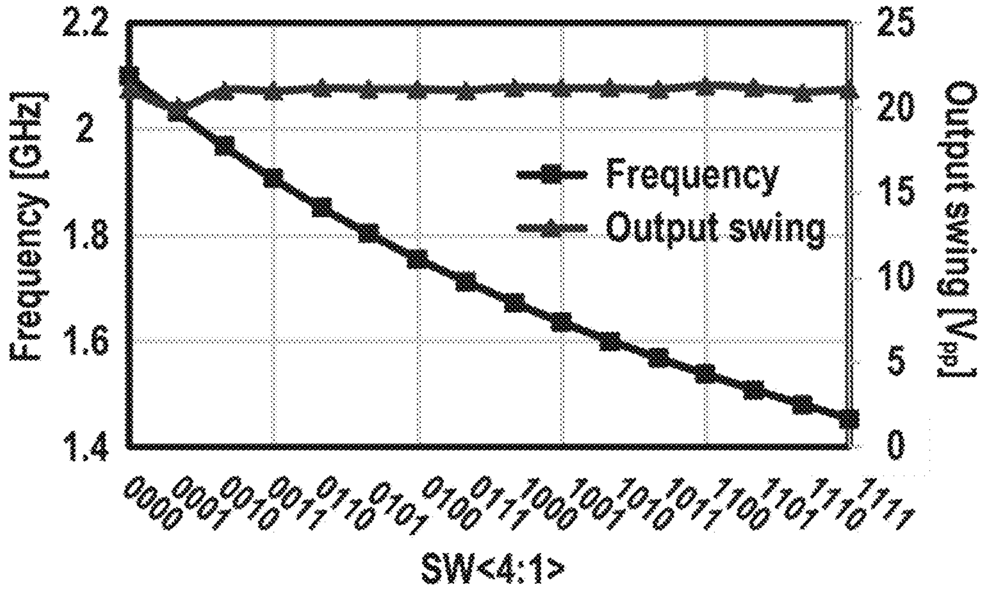
FIG. 13 shows simulation results of stacked oscillators according to one or more embodiments.

The simulated frequency tuning range and the output RF swing of the stacked oscillators in the second frequency range, based on the example in FIG. 3, are shown in FIG. 13. The output RF swing remained above 20 $V_{pp}$ over the entire frequency range from 1.4-2.1 GHz. The simulation used two single-ended capacitor banks.

Figure 14A:
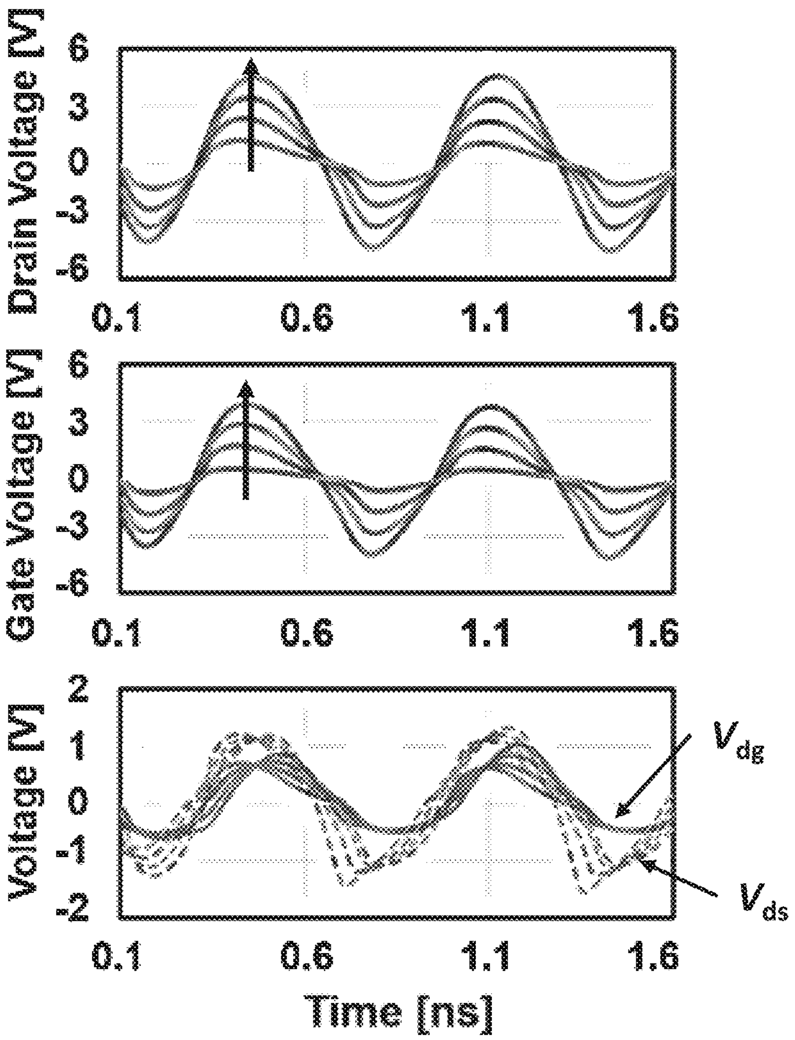
FIG. 14A shows simulation results of a capacitor bank in off state according to one or more embodiments.
Figure 14B:
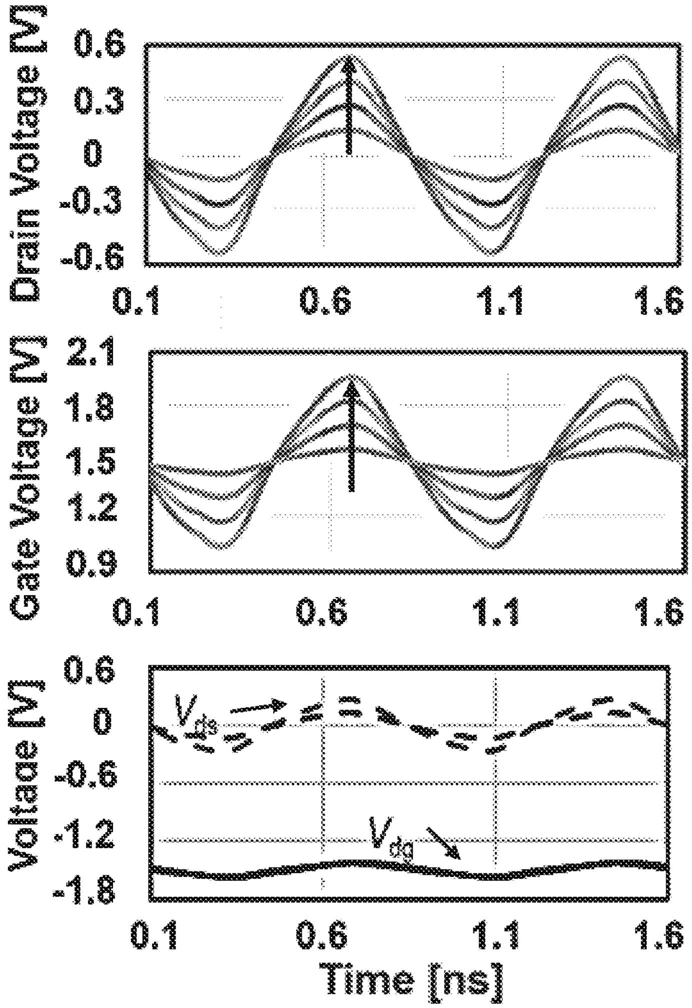
FIG. 14B shows simulation results of a capacitor bank in on state according to one or more embodiments.

To ensure reliable operation of the switches, especially when they experience large RF swing in an off state, a four-stacked switch was implemented with a large resistor $R_g$ added to the gate. $R_g$ introduces a voltage swing by forming a capacitive divider between gate-to-source parasitic capacitance $C_{gs}$ and gate-to-drain parasitic capacitance $C_{gd}$, which prevents unwanted turning on and the breakdown of the switches. Post-layout simulated transient waveforms for the stacked switches in an off state and an on state are shown in FIGS. 14A and 14B, respectively. Gate voltages and drain voltages increase from switch SW1 to switch SW 4, as indicates in arrows. The simulation results verify that stacked switches always work in the safe operating region.

Simulated Electro-Thermal Loop

In one or more embodiments, a transient closed-loop electro-thermal simulation may be performed to verify a thermal regulation behavior of the temperature sensing and control path. The simulation may be performed using Cadence® Virtuoso® and COMSOL Multiphysics®, with a flowchart shown in FIG. 15A and a scheme shown in FIG. 15B. Starting with an initial temperature $T(t_0)$ (1501), at each discrete time instant $t_i$ (for example, 1 ms), an electrical simulation is performed at a local temperature $T(t_i)$ (1502), from which $V_{tail}$ and the RF swing of the stacked oscillator $V_{swing}(t_i)$ are recorded. $V_{swing}(t_i)$ is applied to an inductor for transient thermal analysis in COMSOL using the model in FIG. 7A, resulting in an updated local temperature $T(t_{i+1})$ (1503). It is determined whether a thermal equilibrium is observed (1504), and the processes are repeated if not (1505).

Figure 15A:
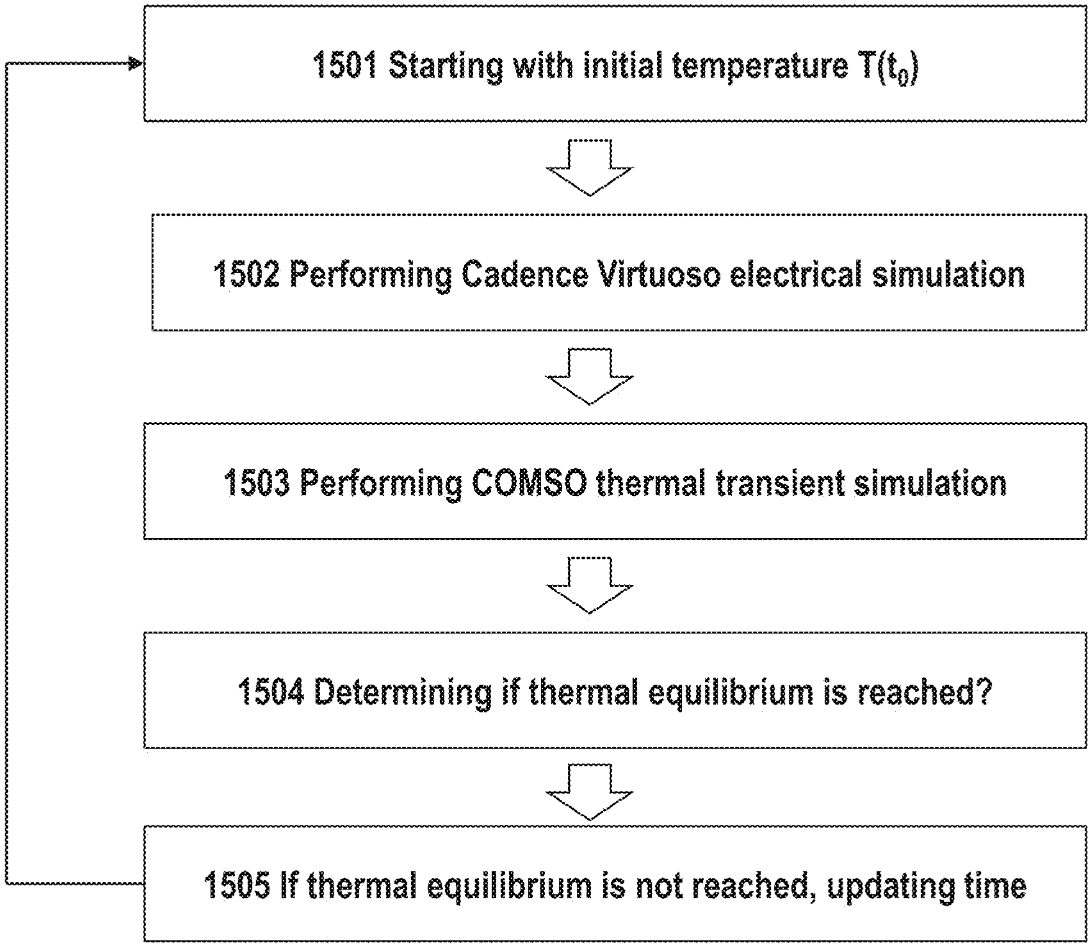
FIG. 15A shows a simulation flow of a temperature sensing and control path according to one or more embodiments.
Figure 15B:
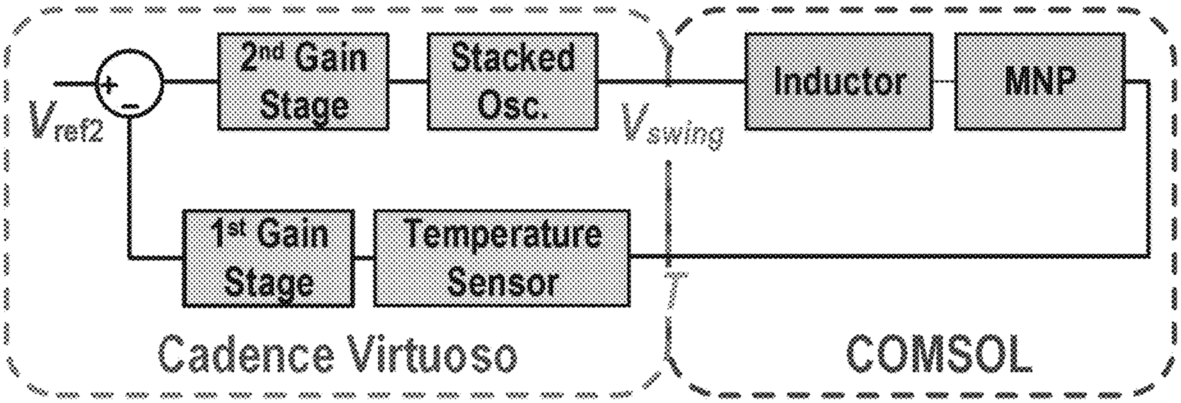
FIG. 15B shows an example of simulation on a temperature sensing and control path according to one or more embodiments.
Figure 16:
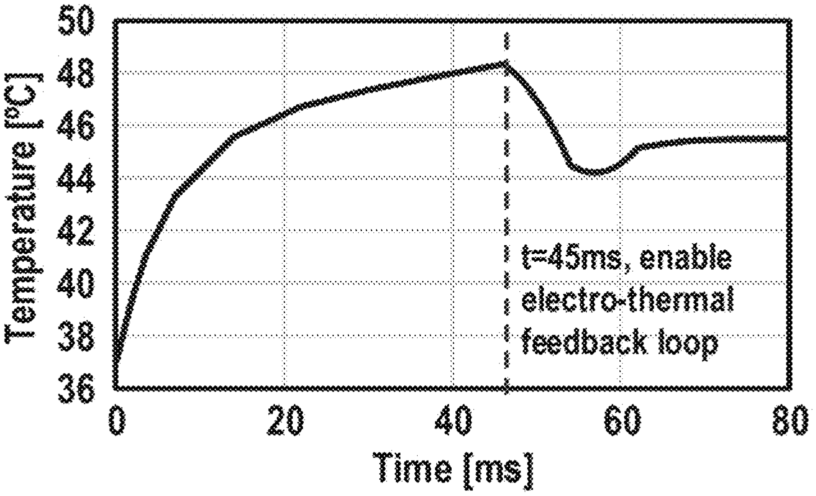
FIG. 16 shows an example of transient temperature response of a temperature sensing and control path according to one or more embodiments.

Simulation results following the simulation flow of FIG. 15A is shown in FIG. 16. The electro-thermal feedback loop is enabled at t=45 ms, and temperature is eventually settled at 45° C. An overall loop gain including the T-to-$V_{swing}$ conversion, and the $V_{swing}$-to-T conversion is calculated as approximately 27 dB from Cadence Virtuoso and COMSOL simulations.

Fabricated Integrated Microheater Array

An example of a microheater array is described herein. The microheater array was fabricated by GlobalFoundries 45-nm CMOS SOI technology. A pixel size is 0.7 mm×0.6 mm. A Serial-to-Parallel-Interface (SPI) was implemented for digital programming. Clock, data, and latch signals of the SPI interface were generated by a data acquisition (DAQ) module (Measurement Computing USB 1608G). Biasing voltages of the stacked transistors were generated using resistive dividers between a supply voltage of the stack oscillators and a ground on the printed circuit board (PCB), which were readily implemented on-chip. The biasing voltages were 0.7V, 2V, 3.5V, and 5V for four-stacked oscillators and 0.65V, 2V, 3.5V, 5V, and 6.5V for five-stacked oscillators, according to an arrangement shown in FIG. 8. The supply voltages are 6V and 7.5V for four-stacked oscillators and five-stacked oscillators, respectively.

Figure 17:
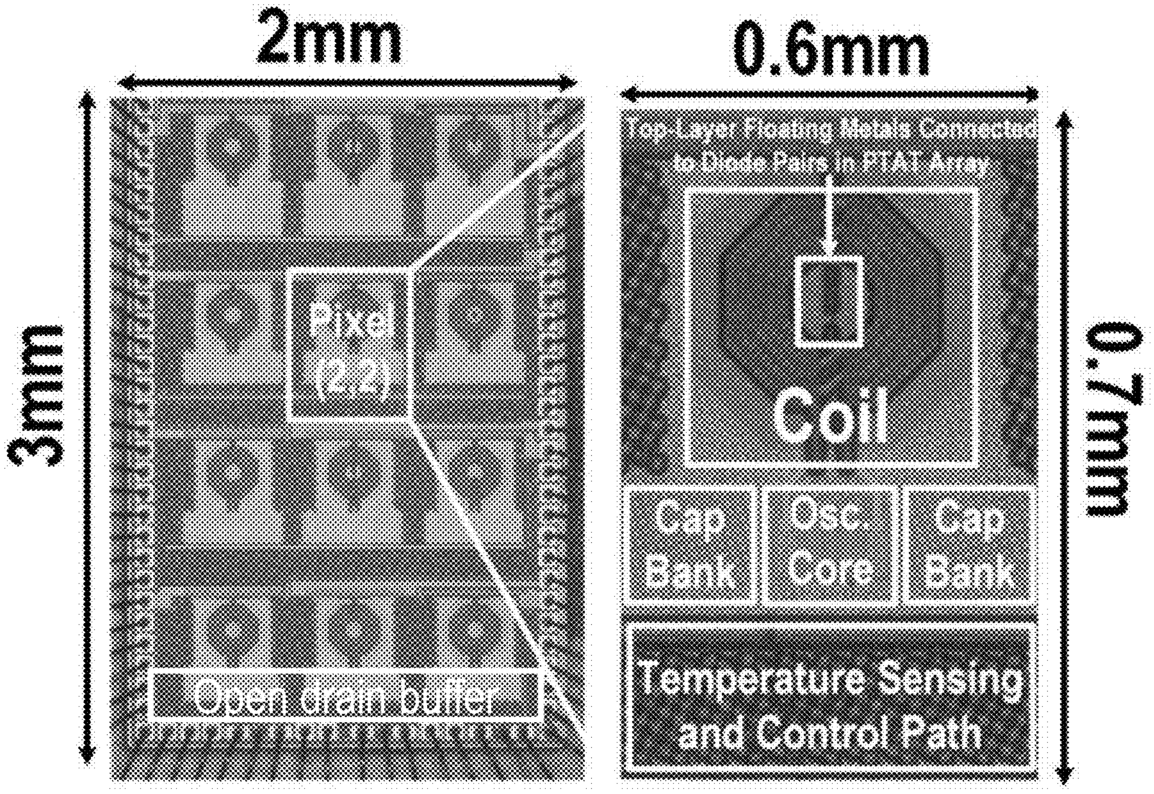
FIG. 17 shows an example of an integrated microheater array device according to one or more embodiments.

FIG. 17 is a micrograph of the integrated microheater array device of 12 pixels with a size of 2×3 $mm^2$, each pixel having a size of 0.6×0.7 $mm^2$. Each pixel comprised an inductor coil, a stacked oscillator having an oscillator core and capacitor banks, and a temperature sensing and control path. The stacked oscillators in the last row were the same as those in the second row, except their outputs are capacitively coupled to an open-drain buffers. The integrated microheater array device disclosed herein may be scaled up to a larger area by increasing the number of pixels.

Measurements of Stacked Oscillator

The measurements were carried out using a fabricated microheater array as described above.

Figure 18:
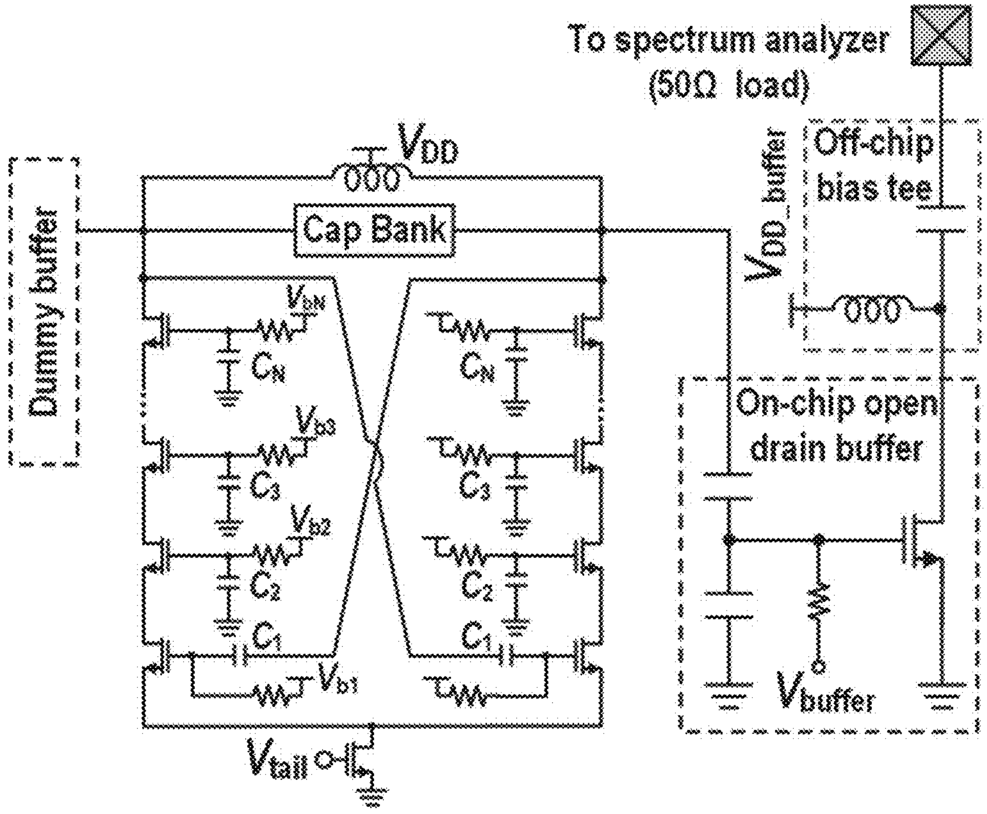
FIG. 18 shows a schematic to measure the output voltage swing of a stacked oscillator according to one or more embodiments.

To monitor the output swing of the stacked oscillator, an open-drain buffer was added to a fourth row of the microheater array and capacitively coupled to the oscillator output, as shown in FIG. 18. A dummy buffer was added to the other side to maintain differential symmetry. The drain terminal of the open-drain buffer was wire bonded to the PCB and routed to an SMA (SubMiniature version A) connector via a 50Ω transmission line. An off-chip bias tee was connected between the SMA connector and the spectrum analyzer.

Figure 19A:
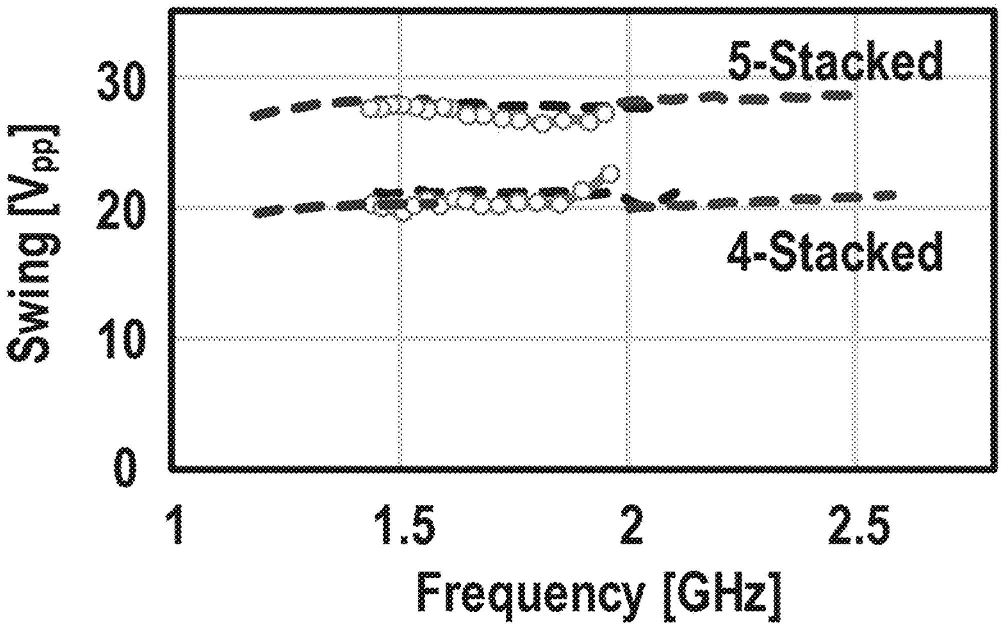
FIG. 19A shows measured and simulated output voltage swings of stacked oscillators according to one or more embodiments.
Figure 19B:
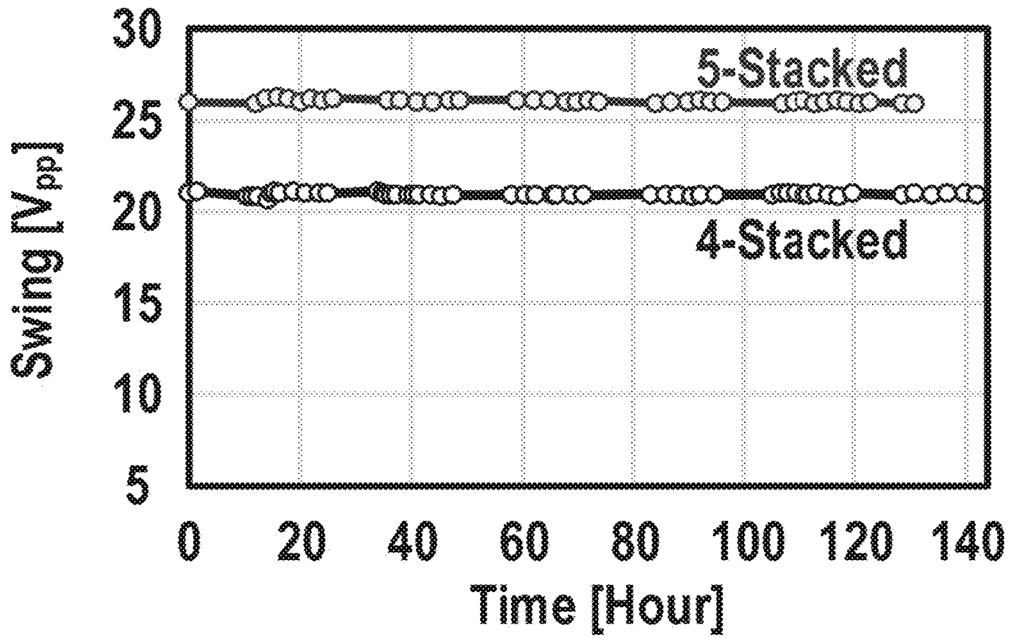
FIG. 19B shows output voltage swings of stacked oscillators according to one or more embodiments.
Figure 19C:
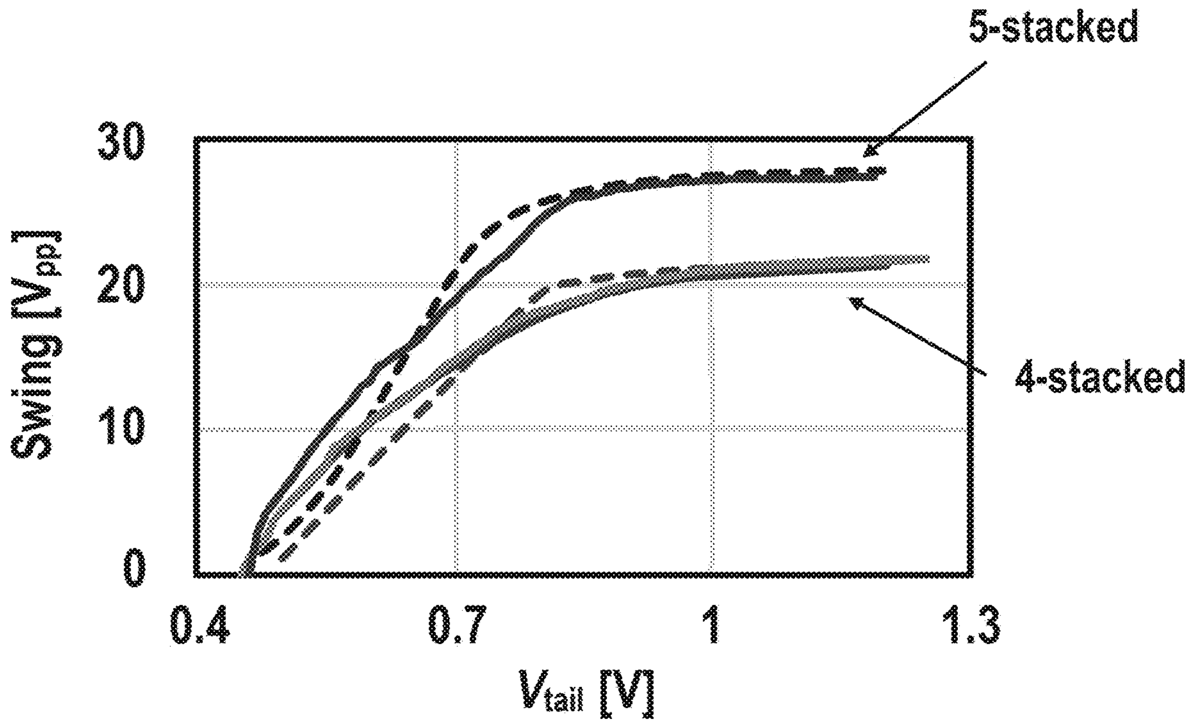
FIG. 19C shows measured and simulated output voltage swings of stacked oscillators according to one or more embodiments.

FIG. 19A shows measured and simulated output voltage swings of the stacked oscillators versus frequency; FIG. 19B shows a continuous measurement of output voltage swings of the stacked oscillators over six days; and FIG. 19C shows output voltage swings of the stacked oscillators in response to $V_{taii}$. The measured RF swing (shown in circles, FIG. 16A) was larger than 19.5 $V_{pp}$ for a four-stacked oscillator and larger than 26.5 $V_{pp}$ for a five-stacked oscillator from 1.44 to 1.95 GHz, which is very close to simulation results (shown in dash lines, FIG. 19A) except for a slight frequency down-shift. The continuous measurement showed that the RF output voltage swing remains constant for six days, verifying a safe and robust operation of the stacked transistors. The correlation of an oscillation amplitude of the stacked oscillators and the biasing voltage of the tail transistor ($V_{tail}$), as shown in FIG. 19C, was used to configure the dc output power. By reducing the biasing voltage of the tail transistor $V_{tail}$, an oscillation amplitude can be backed-off. If a lower temperature is desired, the electro-thermal feedback loop may provide feedback to lower the dc output power and thus reduced the RF output voltage swing.

Measurements of Electro-Thermal Loop

The measurements were carried out using a fabricated microheater array as described above.

Figure 20A:
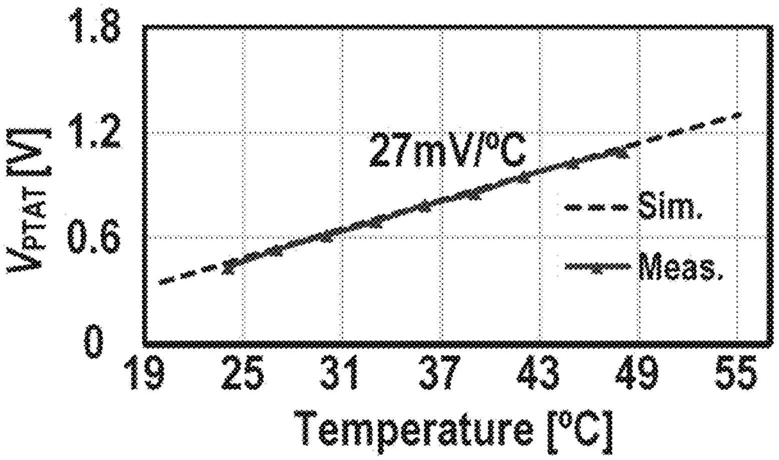
FIG. 20A shows measurement results of a temperature sensing and control path according to one or more embodiments.
Figure 20B:
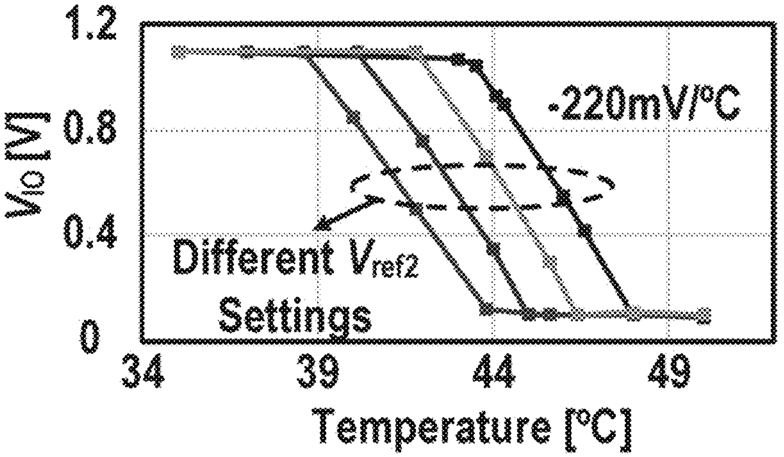
FIG. 20B shows measurement results of a temperature sensing and control path according to one or more embodiments.

A temperature sensing and control path having a design of FIG. 4 was characterized in a temperature chamber. Measured $V_{PTAT}$, which is a temperature sensor output amplified by the $1^{st}$ gain stage, against an ambient temperature is shown in FIG. 20A. A response slope was 27 mV/° C. from 24 to 48° C., presenting a good linearity and alignment with simulation. Measured $V_{IO}$, which is an output of the $2^{nd}$ gain stage, against the ambient temperature is shown in FIG. 20B. The measured temperature-to-$V_{tail}$ conversion gain was −220 mV/° C. An operating temperature range of the electro-thermal feedback loop can be fine-tuned by adjusting the DAC setting of $V_{ref2}$.

Fabricated Integrated Microheater Device in which an MNP Layer is a Membrane

Two PDMS membranes mixed with and without MNPs were used to validate the localized heating performance of the microheater array. The PDMS membranes were fabricated as follows. A sacrificial layer using a photoresist (AZ5209) were spin coated to a substrate (wafer) after a substrate pre-treatment. Next, the PDMS (Sylgard 184 Silicone Elastomer, Dow Corning Corporation) was mixed with MNPs (amorphous $Fe_3O_4$) at a MNP concentration of 3.25 wt %. The MNP-PDMS mixture was thoroughly stirred for 20 minutes followed by sonication in a sonic bath at 35° C. for an hour. Then the MNP-PDMS mixture was spin-coated on the sacrificial layer and cured at 125° C. for 20 minutes. Afterward, the wafer was soaked in an acetone solution for 2 minutes, and the MNP-PDMS membrane floats on the solution surface after the sacrificial layer was dissolved. A thickness of the membrane was estimated to be 36 μm based on the speed and duration parameters used in the spin coating. Finally, the membrane was cut into small pieces and attached on top of the microheater array.

Figure 21:
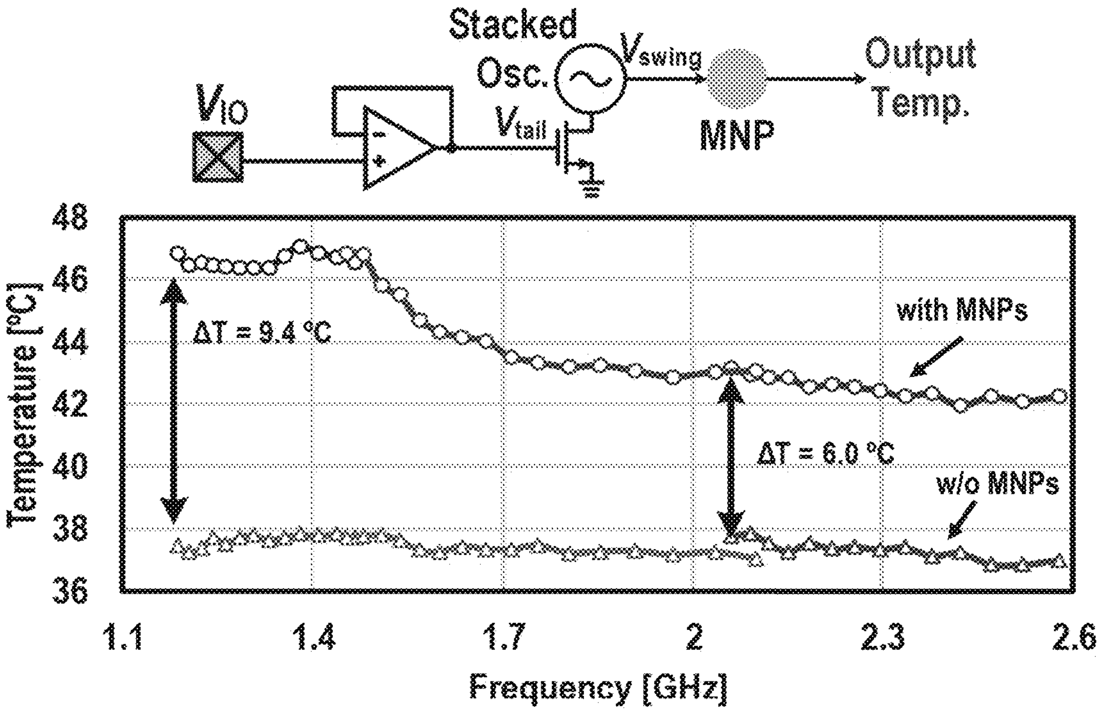
FIG. 21 shows open-loop measurements of an integrated microheater array device according to one or more embodiments.
Figure 22A:
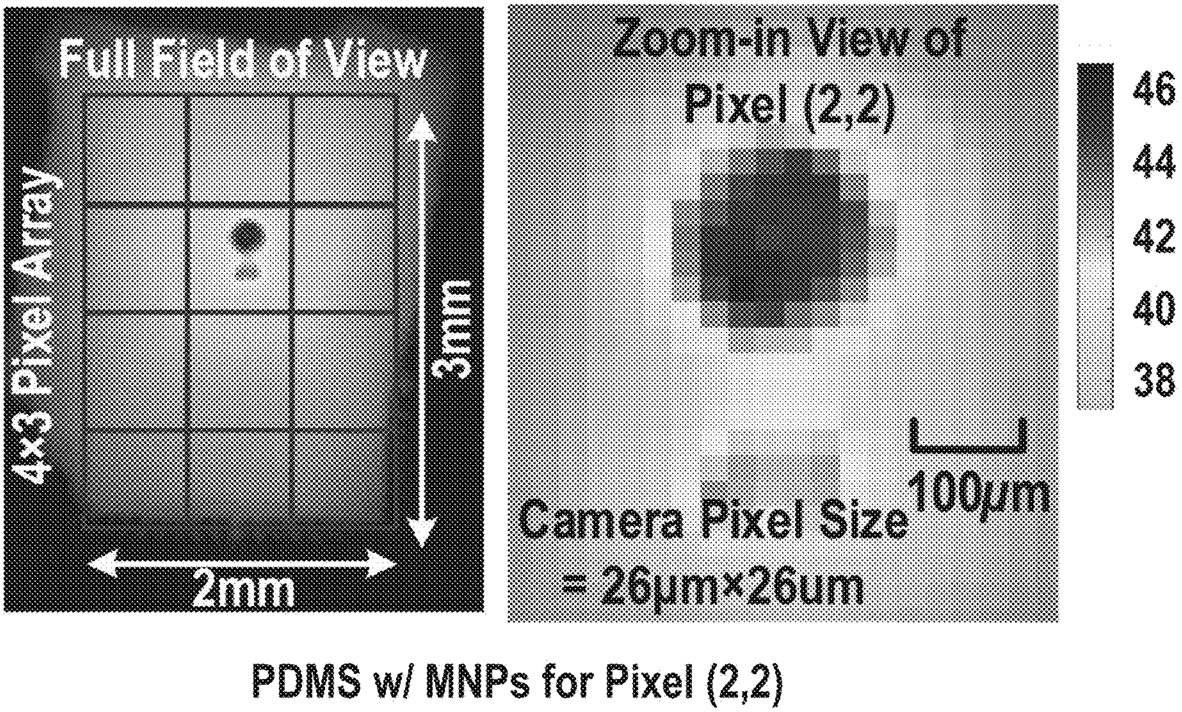
FIG. 22A shows open-loop measurements of surface temperature distribution of an integrated microheater array device with MNPs according to one or more embodiments.
Figure 22B:
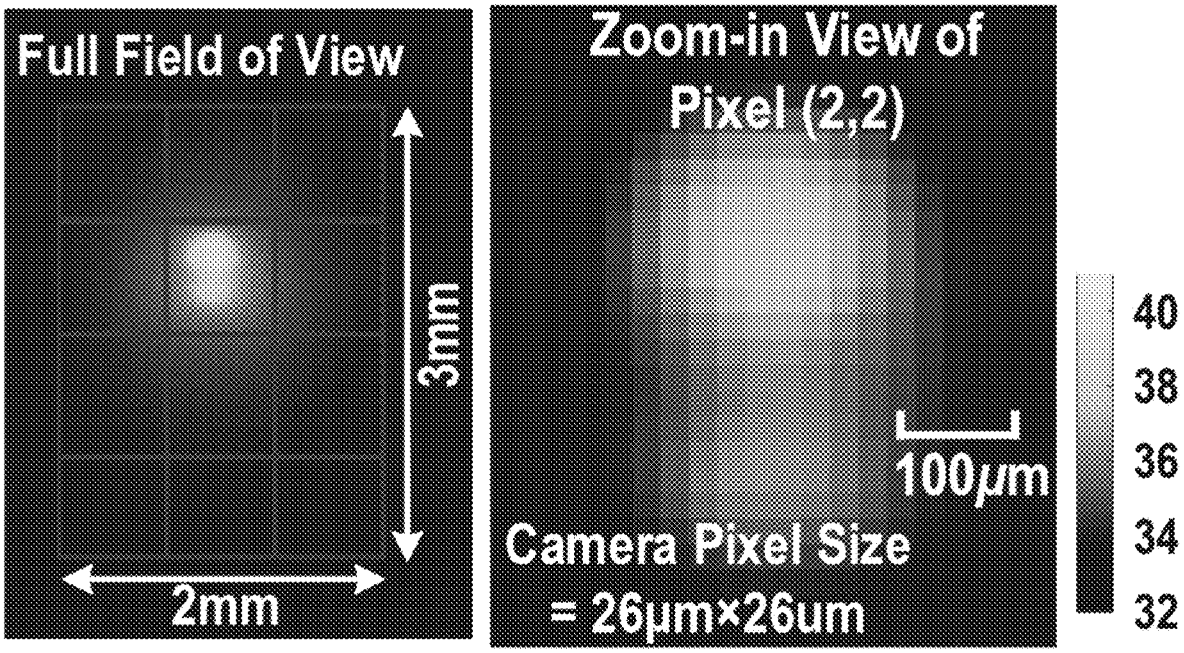
FIG. 22B shows open-loop measurements of surface temperature distribution of an integrated microheater array device without MNPs according to one or more embodiments.

The temperature distribution on the membrane surface was monitored using an IR camera (Infratec VarioCAM® HD 900) with a pixel size of 26 μm×26 μm and real-time displayed on a computer. In an open-loop demonstration as shown in FIG. 21, $V_{tail}$ was biased off-chip through $V_{IO}$. Three stacked oscillators in the second column were used to measure the local temperature rise in three different frequency ranges FR1 to FR3. For PDMS membrane mixed with MNPs, the local temperature was between 41.93 and 47.05° C., as shown in circles. On the other hand, for PDMS membrane without MNP, the local temperature stayed below 37.8° C. under the same biasing condition, as shown in triangles. A temperature difference ΔT with and without the MNPs reached 6.0° C. in FR3 and 9.4° C. in FR1. The measured temperature distributions at 1.45 GHz on the PDMS membrane surfaces with and without MNPs are shown in FIGS. 22A and 22B, respectively. Only the area above the inductors (about 0.03 $mm^2$) in pixel (2,2) was efficiently heated up for the PDMS membrane with MNPs, demonstrating a sub-millimeter spatial resolution. A slight temperature raise was also observed for the PDMS membrane without MNPs, but the highest temperature is <40° C.

Figure 23:
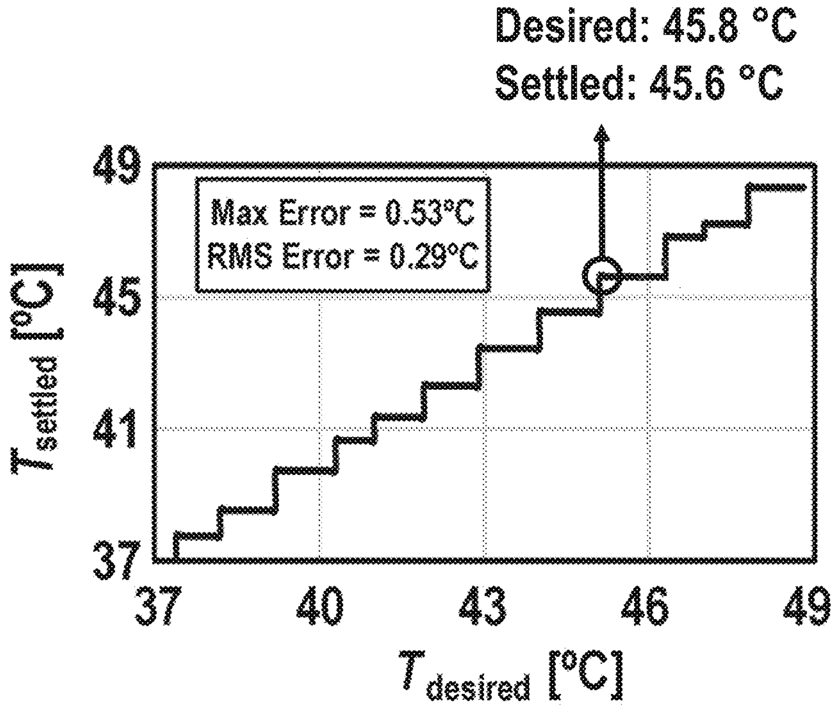
FIG. 23 shows closed-loop measurements of an integrated microheater array device according to one or more embodiments.

In a closed-loop demonstration, DAC setting of $V_{ref2}$ was programmed based on the targeted temperature. $V_{tail}$ was automatically generated through the electro-thermal feedback loop. FIG. 23 shows a settled temperature $T_{settled}$ against a desired temperature $T_{desired}$. $T_{settled}$ was an average IR camera reading over 5 minutes at 1 frame/s frame rate. Extra calibration steps, e.g., correlating camera reading with PTAT voltage and comparing the camera reading of the PCB with a known ambient temperature, were performed to guarantee an accuracy of the temperature measurement. For example, the temperature reached 45.6° C. when the targeted temperature was set to 45.8° C. The maximum and RMS temperature errors were 0.53° C. and 0.29° C. from 37 to 49° C. The dc power was smaller than 0.36 W per pixel. A smaller temperature error can be potentially achieved by increasing the number of bits of the DAC.

Figure 24:
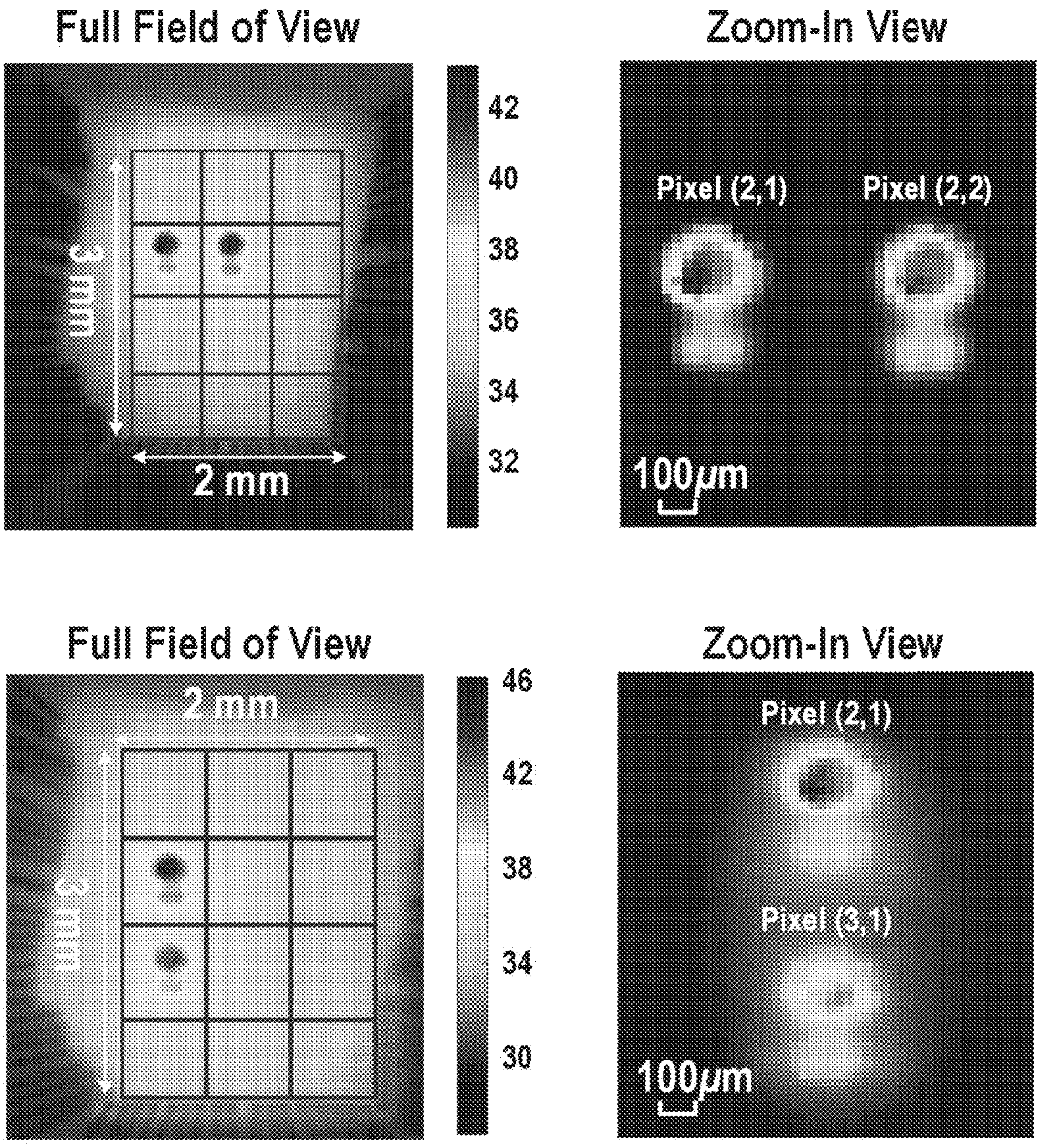
FIG. 24 shows a surface temperature distribution of an integrated microheater array device according to one or more embodiments.

The spatial resolution of the integrated microheater array device is determined by monitoring the temperature of two adjacent pixels. When two adjacent pixels were turned on, a sub-millimeter spatial resolution was achieved. FIG. 24 shows two adjacent pixels in a row (top figures) or in a column (bottom figures) that were enabled simultaneously, verifying a sub-millimeter spatial resolution of the local temperature profile. Only the area above the inductors (about 0.03 $mm^2$) within each pixel was efficiently heated up. Good magnetic isolation is the key to minimize the mutual coupling between adjacent pixels, which was achieved by employing an on-chip ground plane between inductors.

Figure 25:
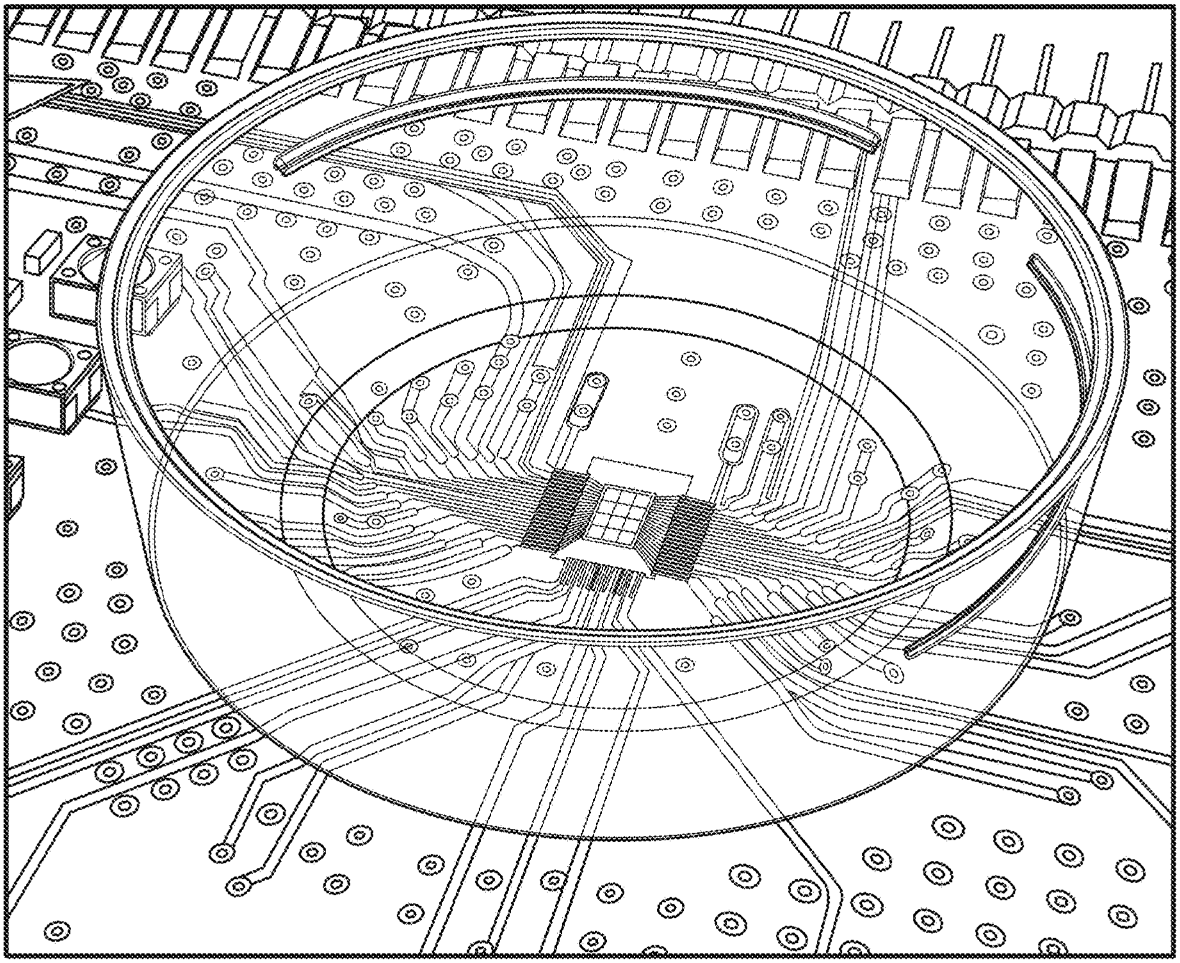
FIG. 25 shows an example of an integrated microheater array device according to one or more embodiments.

Assembled Integrated Microheater Array Device in which an MNP Layer is a Solution A broad view image of an integrated microheater array device is shown in FIG. 25. The solution in a container is disposed over the microheater array.

Figure 26:
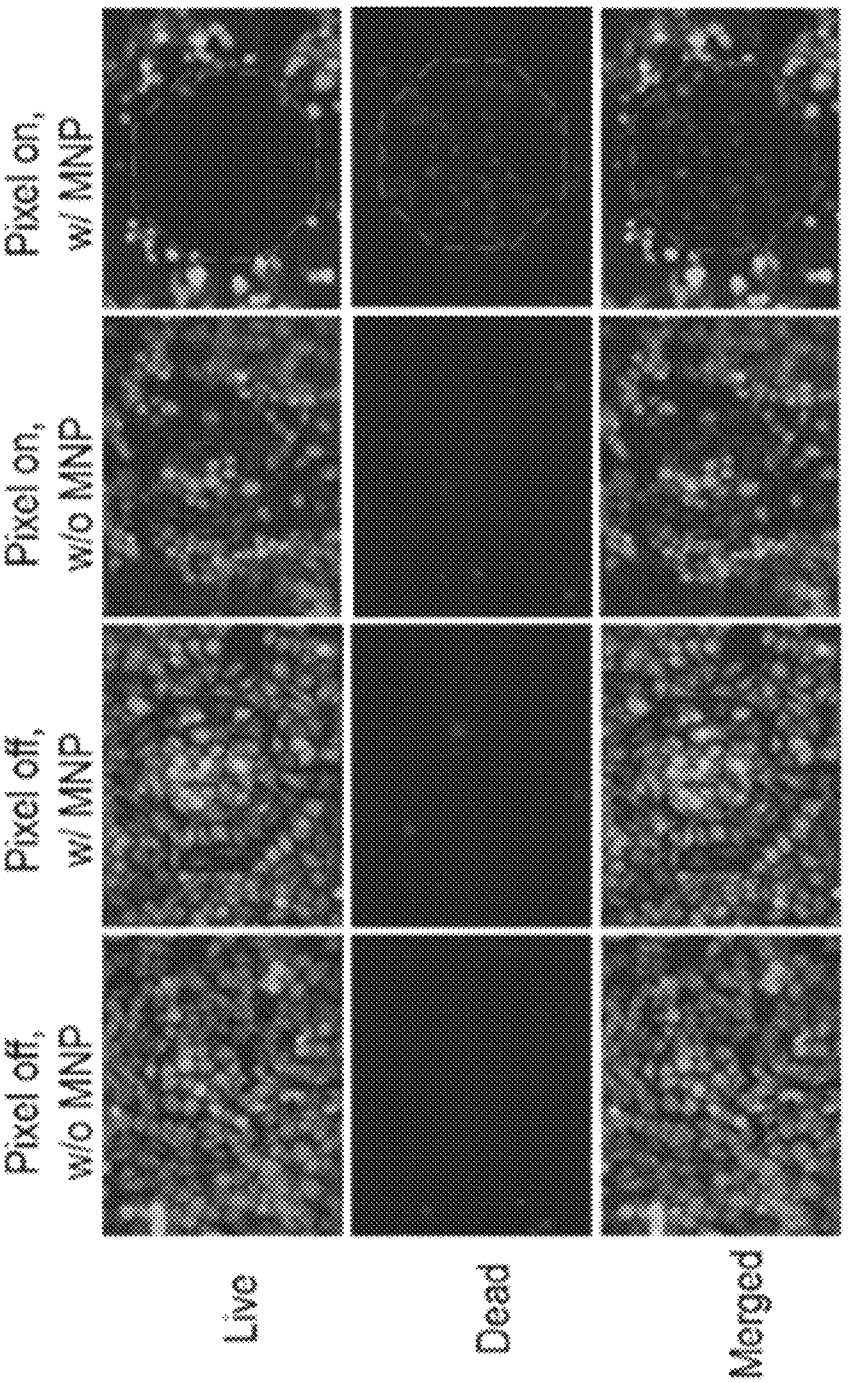
FIG. 26 shows an exemplary application of an integrated microheater array device according to one or more embodiments.

FIG. 26 shows an exemplary application of the integrated microheater array device of FIG. 25. Fluorescent images of live and dead cancer cells, with and without the MNPS, and in off and on states, are shown. The cancer cells were only ablated when MNPs present and when the microheater pixel is turned on. On the other hand, the cancer cells stayed alive in all other conditions. An area of the inductor was highlighted in circles in the figures of the last column. It is clearly shown that only the cancer cells inside the area of the inductor are ablated.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims, except for those in which the claim expressly uses the words 'means for' together with an associated function.

What is claimed is:

1. A microheater array system comprising:

an integrated microheater array configured to generate a localized heat, having a plurality of pixels, wherein each pixel comprises:

an inductor;

a stacked oscillator configured to generate a magnetic field at microwave frequencies with tunable intensity and frequency; and an electro-thermal loop, wherein the stacked oscillator comprises a plurality of transistors connected in series, and a biasing voltage, a biasing resistor, and an external gate capacitor are applied to each transistor.

2. The microheater array system according to claim 1, wherein the electro-thermal loop is configured to regulate a local temperature distribution.

3. The microheater array system according to claim 2, wherein the electro-thermal loop is configured to monitor the localized heat and provide feedback to the stacked oscillator to configure an output of the stacked oscillator.

4. The microheater array system according to claim 1, wherein the microwave frequencies generated by the magnetic field are from 0.3 to 300 GHz.

5. The microheater array system according to claim 1, wherein a spatial resolution defined by a size of the pixels is less than 1 mm.

6. The microheater array system according to claim 1, wherein the localized heat increases a local temperature to at least 43° C.

7. The microheater array system according to claim 1, wherein both a drain-to-source voltage ($V_{ds}$) and a drain-to-gate voltage ($V_{dg}$) for different transistors are close to one another and within a breakdown limit.

8. The microheater array system according to claim 1, wherein the stacked oscillator comprises a tail transistor connected to a source terminal of a bottom of the transistors wherein a gate of the tail transistor is used to control a dc power consumption and output power of the stacked oscillator.

9. The microheater array system according to claim 1, wherein the stacked oscillator includes a capacitor bank.

10. The microheater array system according to claim 1, wherein the stacked oscillator in each pixel occupies one inductor without additional RF amplifiers.

11. The microheater array system according to claim 1, wherein the stacked oscillator has a voltage swing of at least 18 $V_{pp}$.

12. The microheater array system according to claim 1, wherein a simulated dc-to-RF efficiency of the stacked oscillator is at least 45%.

13. The microheater array system according to claim 1, further comprising a plurality of magnetic particles having a having ferromagnetic resonance at resonant microwave frequencies, wherein the microwave frequencies comprise the resonant frequencies; and wherein the electro-thermal loop is configured to monitor the localized heat, wherein the localized heat is generated by the magnetic nanoparticles in response to the magnetic field.

14. The microheater array system according to claim 13, wherein the magnetic particles are magnetic nanoparticles (MNPs).

15. The microheater array system according to claim 14, wherein the MNPs comprise nanostructured or amorphous $Fe_3O_4$.

16. The microheater array system according to claim 13, wherein the magnetic particles are contained in a layer.

17. The microheater array system according to claim 16, wherein the layer comprises a solution.

18. The microheater array system according to claim 16, wherein the layer comprises a membrane.

19. A method for generating localized heat using an integrated microheater array device, comprising:

disposing magnetic nanoparticles on a microheater array, wherein the microheater array comprises a plurality of pixels, each pixel comprises an inductor, a stacked oscillator, and an electro-thermal loop;

generating, by the stacked oscillator, a magnetic field at microwave frequencies with tunable intensity and frequency;

monitoring a localized heat generated by magnetic nanoparticles in response to the magnetic field; and providing feedback through the electro-thermal loop to configure an output power of the stacked oscillator, wherein the stacked oscillator comprises a plurality of transistors connected in series, and a biasing voltage, a biasing resistor, and an external gate capacitor are applied to each transistor.

* * * * *